United States Patent
Innan et al.

(10) Patent No.: US 8,108,644 B2
(45) Date of Patent: Jan. 31, 2012

(54) STORAGE CONTROL APPARATUS, STORAGE SYSTEM, AND VIRTUAL VOLUME CONTROL METHOD

(75) Inventors: Masataka Innan, Odawara (JP); Hideo Tabuchi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 950 days.

(21) Appl. No.: 12/037,482

(22) Filed: Feb. 26, 2008

(65) Prior Publication Data
US 2009/0125694 A1    May 14, 2009

(30) Foreign Application Priority Data

Nov. 9, 2007    (JP) .................................. 2007-292090

(51) Int. Cl.
*G06F 12/00* (2006.01)
(52) U.S. Cl. .................. 711/170; 711/E12.006
(58) Field of Classification Search .................. 711/170, 711/E12.006
See application file for complete search history.

(56) References Cited

U.S. PATENT DOCUMENTS

| | | | | |
|---|---|---|---|---|
| 6,092,168 A | * | 7/2000 | Voigt | 711/170 |
| 2004/0148486 A1 | * | 7/2004 | Burton | 711/202 |
| 2004/0260768 A1 | * | 12/2004 | Mizuno | 709/203 |
| 2005/0091455 A1 | | 4/2005 | Kano et al. | |
| 2006/0206603 A1 | * | 9/2006 | Rajan et al. | 709/223 |

FOREIGN PATENT DOCUMENTS

| | | |
|---|---|---|
| JP | 2003-15915 | 1/2003 |
| JP | 2008-181271 | 8/2008 |

* cited by examiner

*Primary Examiner* — Shane M Thomas
(74) *Attorney, Agent, or Firm* — Brundidge & Stanger, P.C.

(57) ABSTRACT

The storage control apparatus of the present invention saves a table for managing a virtual volume in a pool and keeps the state of the table in the latest state. A first dynamic mapping table (DMT) that manages a first virtual volume is saved in a first pool. Upon receipt of a write command relating to an unused virtual slot from a write command issuing device, a first virtual volume control unit assigns an unused real slot in the first pool to the virtual slot and updates the first DMT. The first virtual volume control unit discriminates the validity of the received data and, in cases where "0" data are received, releases the assigned real slot, updates the first DMT once again, and discards the received data. In cases where the received data are valid data, de-staging is performed following a DMT update.

9 Claims, 22 Drawing Sheets

FIG. 4

LOGICAL VOLUME MANAGEMENT TABLE (133)

| LDEV # (1331) | INTERNAL VOL/ EXTERNAL VOL (1332) | VDEV # (1333) | START ADDRESS (1334) | SIZE (1335) |
|---|---|---|---|---|
| 0x0000 | INTERNAL VOL | 0x0000 | 0x00000000 | 1000 |
| 0x0001 | INTERNAL VOL | 0x0000 | 0x00010000 | 1000 |
| 0x0002 | INTERNAL VOL | 0x0001 | 0x00010000 | 2000 |
| 0x0003 | EXTERNAL VOL | 0x0003 | 0x00010000 | 1000 |
| ... | ... | ... | ... | ... |

FIG. 5

EXTERNAL VOLUME MANAGEMENT TABLE (134)

| VDEV # (1341) | CONNECTION PORT (1342) | EXTERNAL STORAGE INFORMATION (1343) | | | |
|---|---|---|---|---|---|
| | | LUN (C1) | VENDOR NAME (C2) | DEVICE NAME (C3) | VOLUME ID (C4) |
| 0x0000 | | | | | |
| 0x0001 | | | | | |
| 0x0002 | | | | | |
| 0x0003 | 0x01 | 0x02 | H | RA | 123456789 |
| 0x0004 | | | | | |
| 0x0005 | | | | | |
| ... | ... | ... | ... | ... | ... |

FIG. 6

VIRTUAL VOLUME MANAGEMENT TABLE (DMT) — 135

| VIRTUAL VOLUME # (1351) | SLOT # (1352) | ASSIGNMENT FLAG (1353) | POOL # (1354) | SLOT # (1355) |
|---|---|---|---|---|
| 01 | 0x0001 | ASSIGNED | 01 | 0x0001 |
|  | 0x0002 | ASSIGNED |  | 0x0002 |
|  | 0x0003 | UNASSIGNED |  | NULL |
|  | ... | ... |  | ... |
| 02 | 0x0011 | UNASSIGNED | 01 | NULL |
|  | 0x0012 | ASSIGNED |  | 0x01012 |
|  | 0x0013 | ASSIGNED |  | 0x1013 |
|  | ... | ... |  | ... |
| ... | ... | ... | ... | ... |

FIG. 12

VIRTUAL VOLUME MAPPING MANAGEMENT TABLE (136)

| PRIMARY DEVICE # (1361) | VIRTUAL VOLUME # (1362) | SLOT # (1363) | SECONDARY DEVICE # (1364) | VIRTUAL VOLUME # (1365) | SLOT # (1366) |
|---|---|---|---|---|---|
| SS01 | 01 | 0x0001 | SS02 | 11 | 0x1001 |
|  |  | 0x0002 |  |  | 0x1002 |
|  |  | ... |  |  | ... |
| ... | ... | ... |  | ... | ... |

FIG. 13

INTER-CONTROLLER COPY MANAGEMENT TABLE (138A)

| PRIMARY DEVICE # (1381) | GROUP # (1382) | LDEV # (1383) | LBA (1384) | SECONDARY DEVICE # (1385) | GROUP # (1386) | LDEV # (1387) | LBA (1388) |
|---|---|---|---|---|---|---|---|
| SS01 | 01 | 0001 | aaa | SS02 | 01 | 1001 | aaa |
|  |  | 0002 | bbb |  |  | 1002 | bbb |
|  |  | ... | ... |  |  | ... | ... |
|  | ... |  |  |  | ... |  |  |

COPY MANAGEMENT BMP (138B)

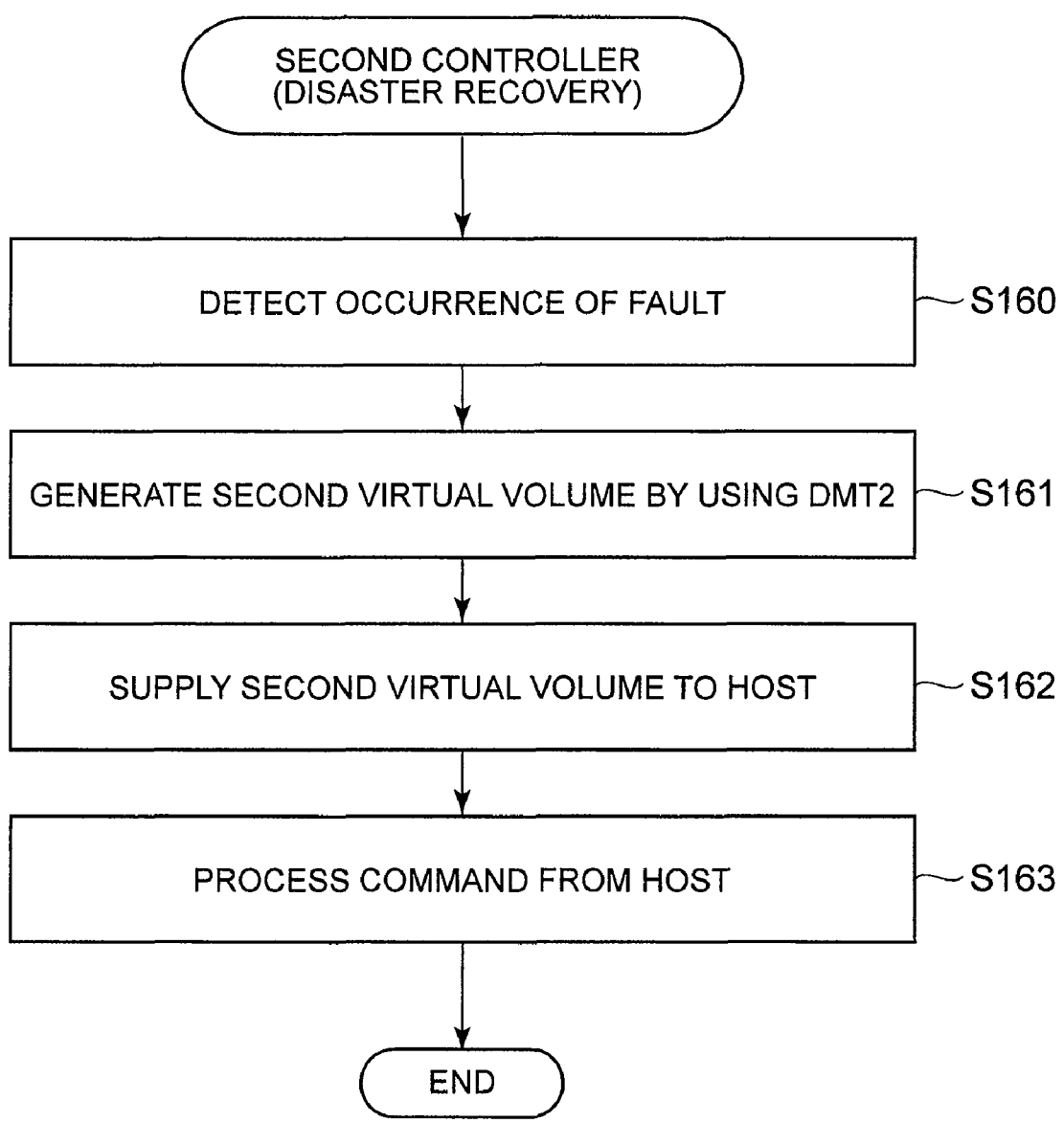

STORAGE CONTROL APPARATUS, STORAGE SYSTEM, AND VIRTUAL VOLUME CONTROL METHOD

CROSS-REFERENCE TO RELATED APPLICATIONS

This application relates to and claims priority from Japanese Patent Application No. 2007-292090 filed on Nov. 9, 2007, the entire disclosure of which is incorporated herein by reference.

BACKGROUND OF THE INVENTION

1. Field of the Invention

The present invention relates to a storage control apparatus, a storage system, and a virtual volume control method.

2. Description of the Related Art

In order to handle large quantities of data of multiple types at government agencies, enterprises, and educational establishments, for example, data are managed using a relatively large-scale storage system. This storage system comprises at least one storage control apparatus. The storage control apparatus comprises a multiplicity of storage devices, for example, and is able to provide a RAID (Redundant Array of Inexpensive Disks)-based storage area. At least one or more logical devices (also known as logical volumes) are formed in a physical storage area that is provided by a storage device group. A host computer ('host' hereinbelow) carries out the writing of data and the reading of data by issuing write commands and read commands to the logical devices.

A technology that dynamically assigns a real storage area to a virtual volume in accordance with a write command (write access) from a host is known (Japanese Application Laid Open No. 2003-15915). In this conventional technology, in cases where the host writes data to a virtual volume, a real storage area is assigned to an area which is designated as the write destination. Therefore, even when the apparent storage capacity of the virtual volume is large, the storage capacity that is actually required is the total value of the areas used by the host. The real capacity of a virtual volume is the total value of the real storage area assigned to the virtual volume. In this conventional technology, the real capacity of the virtual volume can be variably adjusted in accordance with the state of usage of the virtual volume by the host.

The present applicant has disclosed a technology for efficiently backing up data of the virtual volume in the specification of Patent Application No. 2007-013384. However, the specification of Patent Application No. 2007-013384 has not yet been published and does not apply to conventional technology.

The real storage area assigned to the virtual volume is managed by the storage area management table and, therefore, in cases where the storage area management table fails, it is no longer possible to input and output data to and from the virtual volume.

Hence, some manner of protection of the storage area management table is essential from the perspective of the reliability of the storage control apparatus. For example, saving the storage area management table in a duplicated memory or backing up the involatile memory by means of a battery may be considered. However, with respect to the method of saving the storage area management table only in the memory in the controller, it cannot be said that the protection is adequate. In cases where a fault is generated in one of the duplicate memories or where an anomaly is produced in the battery, the redundancy of the protection of the storage area management table has failed.

Therefore, a method of writing the storage area management table to the storage area (real storage area) of the storage device may be considered. However, the timing of writing and saving the storage area management table in the storage device and the timing of writing the user data (write data) written to the virtual volume to the storage device do not necessarily match one another.

In particular, in cases where a storage device that exists outside the storage control apparatus is employed, the de-staging processing for the storage area management table and the de-staging processing for the write data are executed asynchronously. De-staging processing is processing to write data in the cache memory to a storage area of the storage device. Staging processing is, conversely, processing to read data from the storage area of the storage device and store the data in the cache memory.

Because the de-staging processing for the storage area management table and the de-staging processing for the write data are executed asynchronously, the probability that the two types of de-staging processing will no longer conform may be considered. For example, a case where the de-staging processing for the write data is executed first and then the de-staging processing for the storage area management table is carried out is assumed. Although the de-staging processing for the write data ends normally, in cases where the de-staging processing for the storage area management table has not ended normally for whatever reason, the content of the storage area management table and the storage state of the write data no longer conform.

Because the storage area management table has not been updated, the content remains old. Therefore, in cases where a new write command has been issued, there is a possibility that a real storage area in which the write data have already been written will be used for a new write command. When a real storage area that has already been used is used to process another write command, the write data stored in the real storage area are lost.

In cases where a read command is issued, the content of the storage area management table remains old and, therefore, irrespective of whether data have actually been stored in the real storage area of the storage device, it is judged that there are no data. Therefore, the storage control apparatus returns data "0" to the origin of the read command.

Thus, maintaining a more sufficient degree of protection for the storage area management table and maintaining conformity between the storage area management table and the data stored in the real storage area are an important problem for the storage control apparatus which provides the virtual volume.

Further, storage of a copy of the data managed by the storage control apparatus in a backup device is also performed. Here, for example, a case where a backup source storage control apparatus and a backup destination storage control apparatus each comprise a function for generating a virtual volume and a normal volume backup of the whole of the virtual volume is made is assumed.

In this case, because a backup of the whole of the virtual volume identified by the host is made, real capacity of the same size as the virtual capacity of the virtual volume of the backup source virtual volume is used by the backup destination storage control apparatus. This is because a real storage area has also been assigned to an unused area in the backup source virtual volume.

Therefore, the advantage of a virtual volume that allows only the required real storage area to be used as required by the backup destination storage control apparatus is lost and the storage area cannot be used efficiently.

SUMMARY OF THE INVENTION

The present invention was conceived in view of the above problem and an object thereof is to provide a storage control apparatus, storage system, and virtual volume control method which make it possible to maintain conformity between the storage area management table and the write data stored in the real storage area and to improve reliability. A further object of the present invention is to provide a storage control apparatus, storage system, and virtual volume control method that make it possible to maintain the conformity between the storage area management table and the write data stored in the real storage area and to use the storage area efficiently. Further objects of the present invention will become evident from the embodiments described hereinbelow.

In order to solve the above problem, a storage control apparatus according to a first aspect of the present invention is a storage control apparatus which is used by a write command issuing device, comprising: a real storage area management unit that manages a pool which has a plurality of real storage areas; a virtual volume constituted by a plurality of virtual storage areas, the real storage areas being assigned to the virtual storage areas in accordance with a write command issued by the write command issuing device; a storage area management table which is for managing the relationships between the respective virtual storage areas and the respective real storage areas, and which is saved in the pool; and a virtual volume control unit that assigns a predetermined real storage area selected from among unassigned real storage areas among the respective real storage areas in the pool to the predetermined virtual storage area which corresponds with the write command among the respective virtual storage areas which constitute the virtual volume, wherein processing to update the storage area management table in the pool and processing to store the write data, which correspond with the write command, in the predetermined real storage area are executed asynchronously; and the virtual volume control unit executes processing to update the storage area management table after assigning the predetermined real storage area to the predetermined virtual storage area and then executes processing to store the write data in the predetermined real storage area.

A second aspect is the storage control apparatus according to the first aspect, wherein the virtual volume control unit judges whether the write data are invalid write data after updating the storage area management table and, in cases where judgment is made that the write data are invalid write data, releases the predetermined real storage area assigned to the predetermined virtual storage area, updates the storage area management table once again, and discards the invalid write data.

A third aspect is the storage control apparatus according to the second aspect, wherein, in cases where judgment is made that the write data are valid write data, the virtual volume control unit stores the write data in the predetermined real storage area.

A fourth aspect is the storage control apparatus according to the first aspect, wherein the virtual volume control unit judges whether the write data are invalid write data after updating the storage area management table and, in cases where judgment is made that the write data are invalid write data, judges whether the data already stored in the predetermined real storage are invalid data and, in cases where judgment is made that the data already stored in the predetermined real storage area are invalid data, releases the predetermined real storage area and updates the storage area management table once again, and discards the invalid write data.

A fifth aspect is the storage control apparatus according to the fourth aspect, wherein, in cases where judgment is made that the write data are valid write data and incases where judgment is made that the data already stored in the predetermined real storage area are valid data, the virtual volume control unit stores the write data in the predetermined real storage area.

A sixth aspect is the storage control apparatus according to any of the first to fifth aspects, wherein, in cases where the write data are "0" data, the virtual volume control unit judges that the write data are invalid write data and, in cases where the write data are not "0" data, the virtual volume control unit judges that the write data are valid write data.

A seventh aspect is the storage control apparatus according to any of the first to fifth aspects, wherein the real storage area management unit manages a plurality of the pools, and the storage area management table and the write data are each stored in the same pool.

An eighth aspect is the storage control apparatus according to any of the first to fifth aspects, wherein the pool is provided outside the storage control apparatus.

A ninth aspect is the storage control apparatus according to any of the first to fifth aspects, wherein the wherein the virtual volume control unit is able to transfer the write data and the storage area management table to another storage control apparatus for storage therein.

A tenth aspect is the storage control apparatus according to any of the first to fifth aspects, wherein the write command issuing device is any one of a host computer, another storage control apparatus, and a backup device for holding backup data.

A storage system according to an eleventh aspect of the present invention is a storage system having a first storage control apparatus and a second storage control apparatus, wherein the first storage control apparatus comprises: an incorporation unit for using a plurality of real storage areas in a pool of the second storage control apparatus as real storage areas in the first storage control apparatus; a virtual volume constituted by a plurality of virtual storage areas, the real storage areas incorporated by the incorporation unit being assigned to the virtual storage areas in accordance with a write command issued by a write command issuing device; a first storage area management table for managing relationships between the respective virtual storage areas and the respective real storage areas; and a virtual volume control unit that assigns a predetermined real storage area selected from among unassigned real storage areas among the respective real storage areas to the predetermined virtual storage area which corresponds with the write command among the respective virtual storage areas which constitute the virtual volume, and wherein the second storage control apparatus comprises the pool that has the respective real storage areas and a copy of the first storage area management table which is stored in the pool; and the virtual volume control unit (1) after assigning the predetermined real storage area to the predetermined virtual storage area (2) updates the first storage area management table; (3) issues an instruction for updating the copy of the first storage area management table to the second storage control apparatus and, (4) after confirming the update of the copy of the first storage area management table, (5) stores the write data corresponding with the write command in the predetermined real storage area.

The storage system according to a twelfth aspect of the present invention is a storage system having a first storage control apparatus and a second storage control apparatus, wherein the first storage control apparatus comprises: a first real storage area management unit that manages a first pool which has a plurality of first real storage areas; a first virtual volume constituted by a plurality of first virtual storage areas, the first real storage areas being assigned to the first virtual storage areas in accordance with a first write command which is received; a first storage area management table which is for managing relationships between the respective first virtual storage areas and the respective real storage areas, and which is stored in the first pool; a first virtual volume control unit which assigns a predetermined first real storage area selected from among unassigned first real storage areas among the respective first real storage areas in the first pool to the predetermined first virtual storage areas corresponding with the first write command among the respective first virtual storage areas constituting the first virtual volume, the first virtual volume control unit updating the first storage area management table in the first pool after the predetermined first real storage area is assigned to the predetermined first virtual storage area, and storing first write data which correspond with the first write command in the predetermined first real storage area; and a copy control unit which issues a second write command that corresponds with the first write command and stores second write data which correspond with the first write data in the second storage control apparatus by transmitting the second write data to the second storage control apparatus, and the second storage control apparatus comprises: a second real storage area management unit that manages a second pool that has a plurality of second real storage areas; a second virtual volume which is constituted by a plurality of second virtual storage areas, and which forms a copy pair with the first virtual volume, the second real storage areas being assigned to the second virtual storage areas in accordance with the second write command; a second storage area management table which is for managing relationships between the respective second virtual storage areas and the respective second real storage areas, and which is saved in the second pool; and a second virtual volume control unit which assigns a predetermined second real storage area selected among unassigned second real storage areas among the respective second real storage areas in the second pool to the predetermined second virtual storage areas corresponding with the second write command among the respective second virtual storage areas constituting the second virtual volume, second virtual volume control unit updating the second storage area management table in the second pool after the predetermined second real storage area is assigned to the predetermined second virtual storage area, and storing the second write data in the predetermined second real storage area.

A thirteenth aspect is the storage system according to the twelfth aspect, wherein, after updating the first storage area management table, the first virtual volume control unit also judges whether the first write data are invalid first write data and, in cases where judgment is made that the first write data are invalid first write data, releases the predetermined first real storage area assigned to the predetermined first virtual storage area and updates the first storage area management table once again and discards the invalid first write data; and, after updating the second storage area management table, the second virtual volume control unit judges whether the second write data are invalid second write data and, in cases where judgment is made that the second write data are invalid second write data, releases the predetermined second real storage area assigned to the predetermined second virtual storage area and updates the second storage area management table once again and discards the invalid second write data.

The storage system according to a fourteenth aspect of the present invention is a storage system having a first storage control apparatus and a second storage control apparatus, wherein the first storage control apparatus comprises: a first real storage area management unit that manages a first pool which has a plurality of first real storage areas; a first virtual volume constituted by a plurality of first virtual storage areas, the first real storage areas being assigned to the first virtual storage areas in accordance with a first write command which is received; a first storage area management table which is for managing relationships between the respective first virtual storage areas and the respective real storage areas, and which is stored in the first pool; a first virtual volume control unit which assigns a predetermined first real storage area selected from among unassigned first real storage areas among the respective first real storage areas in the first pool to the predetermined first virtual storage areas corresponding with the first write command among the respective first virtual storage areas constituting the first virtual volume, the first virtual volume control unit updating the first storage area management table after the predetermined first real storage area is assigned to the predetermined first virtual storage area, and storing first write data which correspond with the first write command in the predetermined first real storage area; and a first copy control unit which transmits the data stored in the first pool and the first storage area management table to the second storage control apparatus to copy the data stored in the first pool and the first storage area management table to the second pool in the second storage control apparatus, and the second storage control apparatus comprises: a second real storage area management unit that manages the second pool that has a plurality of second real storage areas; a second virtual volume which is constituted by a plurality of second virtual storage areas, and which forms a copy pair with the first virtual volume; a virtual volume mapping management table for managing relationship between the first virtual volume and the second virtual volume; a second storage area management table which is for managing relationships between the respective second virtual storage areas and the respective second real storage areas, and which is stored in the second pool; a second copy control unit which stores in the second pool the data in the first pool received from the first copy control unit and the first storage area management table; and a second virtual volume control unit which manages the constitution of the second virtual volume and which, in cases where the first storage area management table copied to the second pool is updated, updates the second storage area management table by using the copy of the first storage area management table in the second pool, the virtual volume mapping management table, and the copy management table managed by the second copy control unit.

The virtual volume control method according to a fifteenth aspect of the present invention is a virtual volume control method in which a real storage area is assigned to a virtual storage area in accordance with a write command, the method comprising the steps of judging whether a real storage area is assigned to a virtual storage area which is designated by the write command; selecting an unassigned real storage area from within a pool and assigning the unassigned real storage area to the designated virtual storage area in cases where the real storage area has not been assigned to the designated virtual storage area; updating a storage area management table for managing relationship between the virtual storage area and the real storage area; receiving write data which correspond with the write command and storing same in a cache memory; judging whether the write data stored in the cache memory are valid write data; releasing the real storage area assigned to the designated virtual storage area to restore the real storage area to an unassigned state in cases where judgment is made that the write data are invalid write data; updating the storage area management table once again; discarding the invalid write data stored in the cache memory; and storing valid write data in the real storage area assigned to the designated virtual storage area in cases where judgment is made that the write data stored in the cache memory are valid write data.

All or some of the means, functions, and steps of the present invention can be sometimes constituted as a computer program that is executed by a computer system. In cases where all or some of the constitution of the present invention is constituted by a computer program, the computer program can be distributed by being secured on various storage media or can be transmitted via a communication network, for example.

BRIEF DESCRIPTION OF THE DRAWINGS

FIG. 4 is an explanatory diagram that shows a logical volume management table;

FIG. 5 is an explanatory diagram that shows an external volume management table;

FIG. 6 is an explanatory diagram that shows a virtual volume management table;

FIG. 12 is an explanatory diagram that shows a virtual volume mapping management table;

FIG. 13 is an explanatory diagram that shows an inter-controller copy management table and a copy management bitmap;

FIG. 24 is a flowchart that shows disaster recovery processing which is executed by a storage system according to a fifth embodiment.

DESCRIPTION OF THE SPECIFIC EMBODIMENTS

Figure 1:
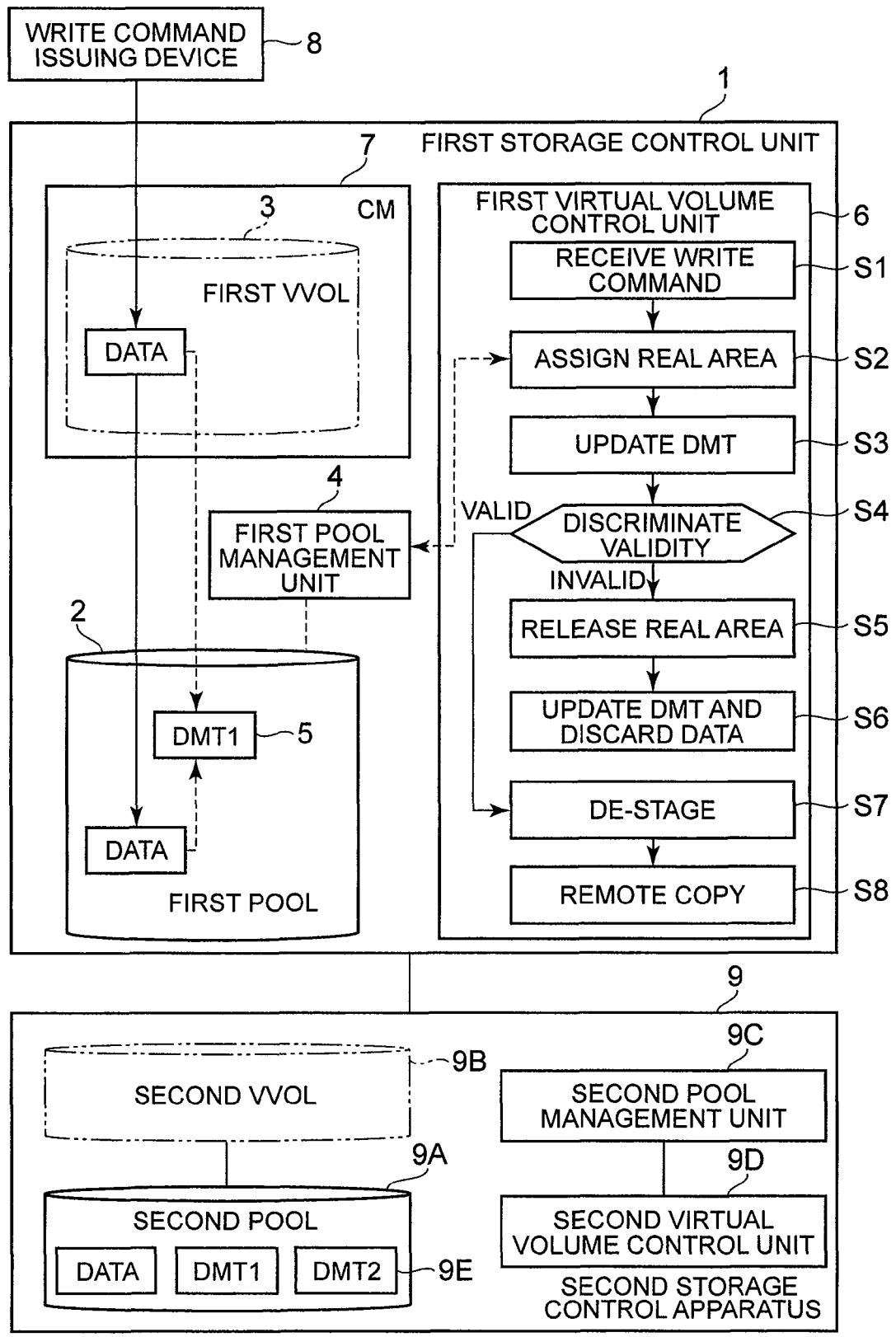
FIG. 1 is a conceptual view of an embodiment of the present invention.

FIG. 1 is an explanatory diagram that provides an overview of an embodiment of the present invention. As will be described subsequently, the conformity between the management of the data storage destination and the actual storage state is maintained and the storage areas are used efficiently.

The storage system shown in FIG. 1 is constituted comprising, for example, a first storage control apparatus 1, a write command issuing device 8, and a second storage control apparatus 9, for example. The write command issuing device 8 is constituted as a computer device such as a mainframe computer, a server computer, a host computer such as a personal computer, or another storage control apparatus (including a second storage control apparatus 9), or a backup device 50 (See FIG. 19) for example.

The write command issuing device 8 and first storage control apparatus 1 are connected via a communication network CN such as an FC_SAN (Fibre Channel_Storage Area Network), an IP_SAN (Internet Protocol_SAN), or a LAN (Local Area Network), for example.

In cases where the write command issuing device 8 is a mainframe computer, a communication protocol such as FICON (Fibre Connection: registered trademark), ESCON (Enterprise System Connection: registered trademark), ACONARC (Advanced Connection Architecture: registered trademark), FIBARC (Fibre Connection Architecture: registered trademark), for example, is used. In cases where the write command issuing device 8 is a server computer, a personal computer or another storage control apparatus, a communication protocol such as TCP/IP (Transmission Control Protocol/Internet Protocol), FCP (Fibre Channel Protocol), iSCSI (internet Small Computer System Interface), for example, is used.

The first storage control apparatus 1 comprises a first pool 2, a first virtual volume 3, a first pool management unit 4, a first storage area management table 5, a first virtual volume control unit 6, and a cache memory 7, for example. In the drawings and following description, the storage area management table will be expediently denoted as a 'DMT (Dynamic Mapping Table)'.

The first pool 2 comprises physical storage areas (real storage areas) which a plurality of storage devices each comprise. A variety of types of storage devices can be used as the storage devices such as, for example, hard disk devices, flash memory devices, magneto-optical disks, optical disks, FeRAM (Ferroelectric Random Access Memory), MRAM (Magnetoresistive Random Access Memory), Ovonic Unified Memory, and RRAM (Resistance RAM). In cases where hard disk devices are used as the storage devices, FC (Fibre Channel) disks, SCSI (Small Computer System Interface) disks, SATA disks, ATA (AT Attachment) disks, and SAS (Serial Attached SCSI) disks and so forth can be used, for example.

The virtual volume 3 is a logical volume which is generated virtually. The real storage area in the first pool 2 is assigned to the virtual storage area constituting the virtual volume 3 in accordance with a write command that is issued by the write command issuing device 8. The write data for which the virtual volume 3 is the write destination are stored temporarily in the cache memory 7. The write data stored in the cache memory 7 are written to the storage device with the appropriate timing. Processing to write the data of the cache memory 7 to the storage device is called de-staging processing (de-staging) and processing to store the data in the storage device in the cache memory 7 is known as staging processing (staging).

The first pool management unit 4 corresponds to the 'real storage area management unit'. The first pool management unit 4 manages the respective real storage areas in the first pool 2. That is, the first pool management unit 4 manages which real storage areas are being used and which real storage areas are unused.

The first DMT 5 is information for managing the constitution of the virtual volume 3. The first DMT 5 manages which virtual storage areas in the virtual volume are associated with which real storage areas. Therefore, by using the first DMT 5, the write data which designate a virtual storage area in the virtual volume 3 as the write destination can be stored in the real storage area which corresponds with the designated virtual storage area.

The first virtual volume control unit 6 controls the virtual volume 3. The first virtual volume control unit 6 assigns a real storage area to the virtual volume 3 in accordance with a received write command and writes the received write data in the real storage area.

The second storage control apparatus 9 is a storage control apparatus which is separate from the first storage control apparatus 1. The second storage control apparatus 9 comprises a second pool 9A, a second virtual volume 9B, a second pool management unit 9C, a second virtual volume control unit 9D, and a second DMT 9E, for example.

As will be clear in the subsequent embodiments, the second storage control apparatus 9 can be employed in a plurality of applications. The first application uses the second storage control apparatus 9 as a providing storage control apparatus for providing a real storage area in the first storage control apparatus. That is, the first storage control apparatus 1 incorporates the real storage area which the second pool 9A comprises to the first storage control apparatus 1 and uses the real storage area as if same were a real storage area of the first storage control apparatus 1. For example, by managing information for accessing the real storage area in the second pool 9A in the first storage control apparatus 1, the first storage control apparatus 1 is able to input data to and from the real storage area in the second pool 9A.

In the case of the first application, the second storage control apparatus 9 is a storage control apparatus that is subordinate to the first storage control apparatus 1. The real storage area required by the first storage control apparatus 1 is provided by the second storage control apparatus 9. Therefore, the first storage control apparatus 1 need not comprise the first pool 2. In the first application, the first storage control apparatus 1 can be constituted as a virtual apparatus that virtualizes the second storage control apparatus or as a switch which comprises a virtual function.

The second application treats the second storage control apparatus 9 as the same storage control apparatus as the first storage control apparatus 1 and is used to back up the first storage control apparatus 1. In this application, for example, the first storage control apparatus 1 is a primary storage control apparatus and the second storage control apparatus 9 is the secondary storage control apparatus.

In the second application, the first virtual volume 3 and second virtual volume 9B form a copy pair and the same stored content as the stored content of the first virtual volume 3 are copied to the second virtual volume 9B. As a result, even in cases where some kind of fault arises with the first storage control apparatus 1, the host is able to continue the task processing by using the second storage control apparatus 9.

The third application involves using the second storage control apparatus 9 to back up the first storage control apparatus 1 but does not normally form a virtual volume 9B. That is, the second storage control apparatus 9 holds a copy of the data stored in the first virtual volume 3 and a second DMT 9E for generating the second virtual volume 9B and, in cases where a fault arises with the first storage control apparatus 1, the second storage control apparatus 9B is generated.

The fourth application uses the second storage control apparatus 9 as a backup device for storing backup data. In the fourth application, the stored content at a predetermined point in time of the first virtual volume 3 are pre-copied to the second virtual volume 9B. In cases where the first storage control apparatus 1 has recovered from a fault, the stored content of the first virtual volume 3 can be restored to the stored content at a predetermined point in time by making an initial copy from the second virtual volume 9B to the first virtual volume 3. Applications other than those above may also be considered. There are also cases where a plurality of the above applications are combined.

The operation of the storage system of this embodiment will now be described. Upon receipt of a write command which is issued by the write command issuing device 8 (S1), the first virtual volume control unit 6 assigns an unassigned (unused) real storage area which is pooled in the first pool 2 (or second pool 9A) to the virtual storage area designated by the write command (S2). The first virtual volume control unit 6 assigns a real storage area in the virtual storage area (S2) and then updates the first DMT 5 in the first pool 2 (S3). In the case of a write command to rewrite the virtual storage area to which a real storage area has already been assigned, a real storage area is not assigned.

The write data transmitted by the write command issuing device 8 are received by the first storage control apparatus 1 and stored in the cache memory 7. The first virtual volume control unit 6 analyzes the write data stored in the cache memory 7 and judges whether the write data are valid (S4).

Valid write data are write data whose data main body excluding a logical address or the like includes data other than "0" and invalid write data are data whose data main body is entirely made up of "0".

In the case of valid write data, the first virtual volume control unit 6 stores write data which are stored in the cache memory 7 with suitable timing in a real storage area which is associated as the storage destination of the write data (S7). The first storage control apparatus 1 and second storage control apparatus 9 constitute a cluster and, in cases where a disaster recovery system is configured, the first virtual volume control unit 6 is also able to implement a copy by transmitting the write data to the second storage control apparatus 9 (S8).

In the case of invalid write data, the first virtual volume control unit 6 releases the real storage area assigned in S2 and restores the real storage area to an unassigned state (S5). In addition, the first virtual volume control unit 6 once again updates the first DMT 5 to store the release of the real storage area (S6). In addition, the first virtual volume control unit 6 discards invalid write data which are stored in the cache memory 7 (S6).

The destruction of write data on the cache memory 7 is not limited to cases where the write data are deleted and also includes cases where re-use of the cache area where the write data are stored is permitted. In a normal case, the data stored in the cache memory 7 are protected until the de-staging processing is complete and overwriting the cache area is restricted.

In cases where de-staging processing is complete, the cache area can be similarly used as an unused area. Therefore, in the case of invalid write data, the management status of the cache area for storing the write data can be re-used in order to incorporate other new write data by setting a state where the de-staging processing is complete.

This embodiment which is constituted in this manner affords the following effects. In this embodiment, after assigning a real storage area to the virtual storage area (S2), the first DMT 5 is updated (S3) and de-staging processing for write data is executed (S7). Therefore, the stored content of the first DMT 5 can always be kept in the latest state and the storage state of the write data and the stored content of the DMT 5 can be matched.

If, in cases where the de-staging processing (S7) for the write data fails for whatever reason, the write data are protected in the cache memory 7 until the de-staging processing is complete and, therefore, the write data do not disappear. Further, the write data are written to the real storage area as a result of the de-staging processing which is executed with different timing. When the de-staging processing for the write data is complete, there is a match between the actual storage state of the write data and the stored content of the DMT 5. Therefore, a situation where a real storage area that has already been assigned is assigned to another write command as a result of a DMT with old content is prevented from arising. As a result, the reliability of the storage control apparatus improves and user convenience also rises.

In this embodiment, it is judged whether write data are valid (S4) and, in cases where it is judged that write data are invalid write data, the assigned real storage area is released (S5) and the invalid write data are discarded (S6). Therefore, the real storage area can be efficiently utilized by preventing the assignment of a real storage area to an unused virtual storage area.

Examples include a case where the second storage control apparatus 9 holds backup data for the whole of the first virtual volume 3 and the backup data of the second storage control apparatus 9 are restored to the first storage control apparatus 1.

The backup data of the second storage control apparatus 9 are data for the whole virtual capacity of the first virtual volume 3 and correspond with all the virtual storage areas irrespective of whether the data are being used. Therefore, when the backup data are transferred from the second storage control apparatus 9 to the first storage control apparatus 1, the first virtual volume control unit 6 also assigns real storage areas to unused virtual storage areas. As a result, the usage efficiency of the real storage area drops and the advantage of the virtual volume 3 is lost.

In contrast, in this embodiment, the validity of received write data is judged and real storage areas are assigned only in cases of valid write data. A real storage area is not assigned to invalid write data. Hence, the real storage area can be efficiently used.

In this embodiment, both the DMT 5 and write data are saved in the same pool 2 (or pool 9A) and, therefore, in comparison with a constitution where the DMT 5 is only saved in the memory, the DMT 5 can be more rigidly protected and, therefore, the reliability of the storage control apparatus can be improved.

The above embodiment provides an outline of the present invention which serves to provide an understanding of the present invention and the scope of the present invention is not restricted to the example shown in FIG. 1. This embodiment will be described in detail hereinbelow.

First Embodiment

Figure 2:
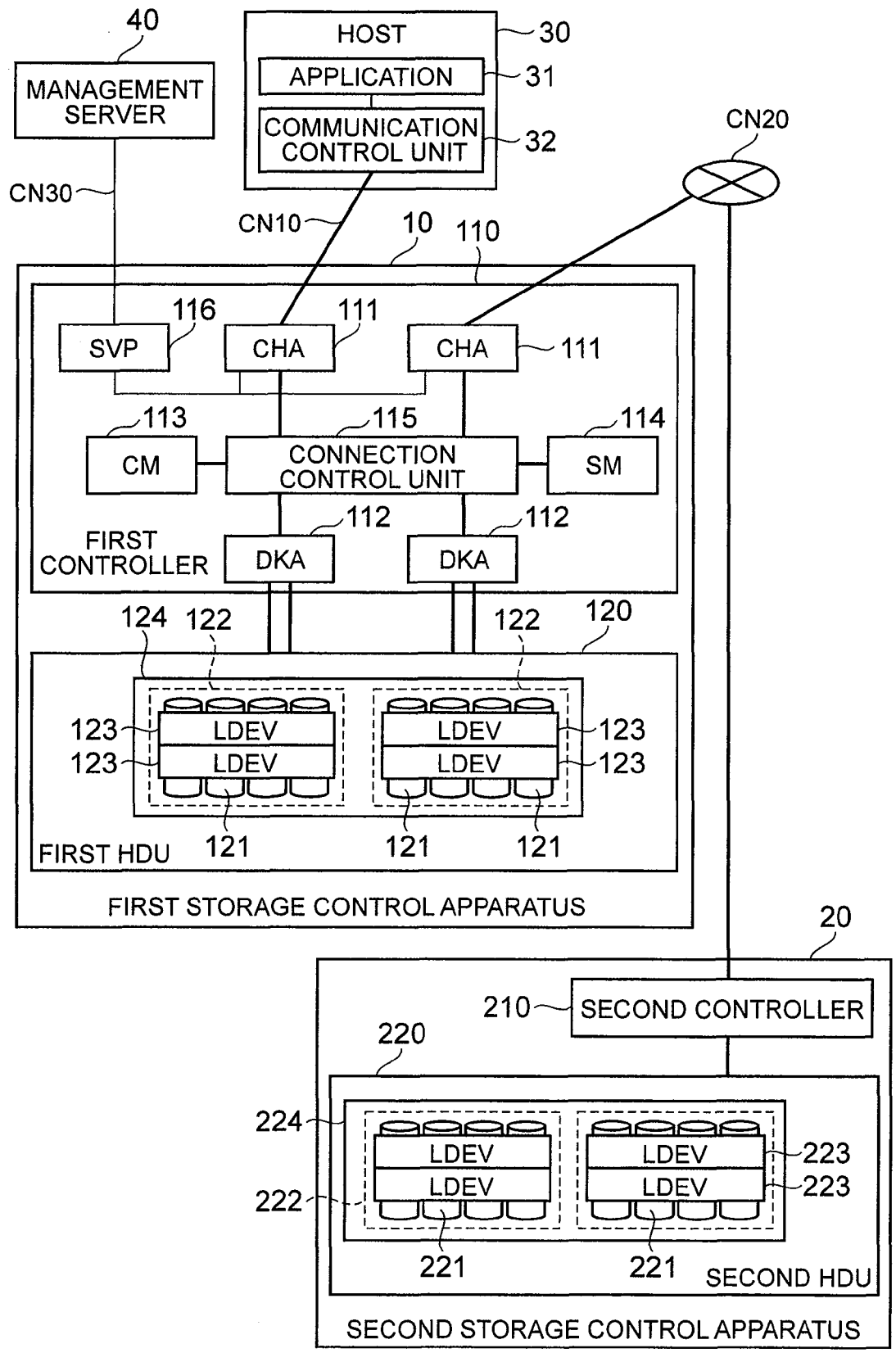
FIG. 2 is a hardware constitutional view of the system according to the embodiment of the present invention.

FIG. 2 is an explanatory diagram that provides an overview of the storage system according to this embodiment. This embodiment describes a case where a first storage control apparatus 10 incorporates and uses the real storage area of a second storage control apparatus 20.

From the perspective of the first storage control apparatus 10, the second storage control apparatus 20 is a storage control apparatus that exists outside the first storage control apparatus 10. Hence, the second storage control apparatus 20 can also be called an external storage control apparatus. In this embodiment, the first storage control apparatus 10 generates a virtual volume by using a real storage area of the second storage control apparatus 20. Host 30 is able to see data being read from and written to the virtual volume in the first storage control apparatus 10 but the actual storage destination of the data is the real storage area in the second storage control apparatus 20. Thus, a constitution in which the first storage control apparatus 10 utilizes a real storage area of the second storage control apparatus 20 that exists outside the first storage control apparatus 10 will be known in this specification as an 'external connection'. The first storage control apparatus 10 is the connection-source storage control apparatus of the external connection constitution and the second storage control apparatus 20 is the connection-destination storage control apparatus in the external connection constitution.

The relationship of FIG. 2 with FIG. 1 will now be described. The first storage control apparatus 10 corresponds to the first storage control apparatus 1 in FIG. 1; the second storage control apparatus 20 corresponds to the second storage control apparatus 9 in FIG. 1; the host 30 corresponds to the write command issuing device 8 in FIG. 1; first pool 124 corresponds to the first pool 2 in FIG. 1; second pool 224 corresponds to the second pool 9A in FIG. 1. First controller 110 implements the functions of the first virtual volume control unit 6 in FIG. 1 and second controller 210 implements the functions of the second virtual volume control unit 9D in FIG. 1.

Figure 3:
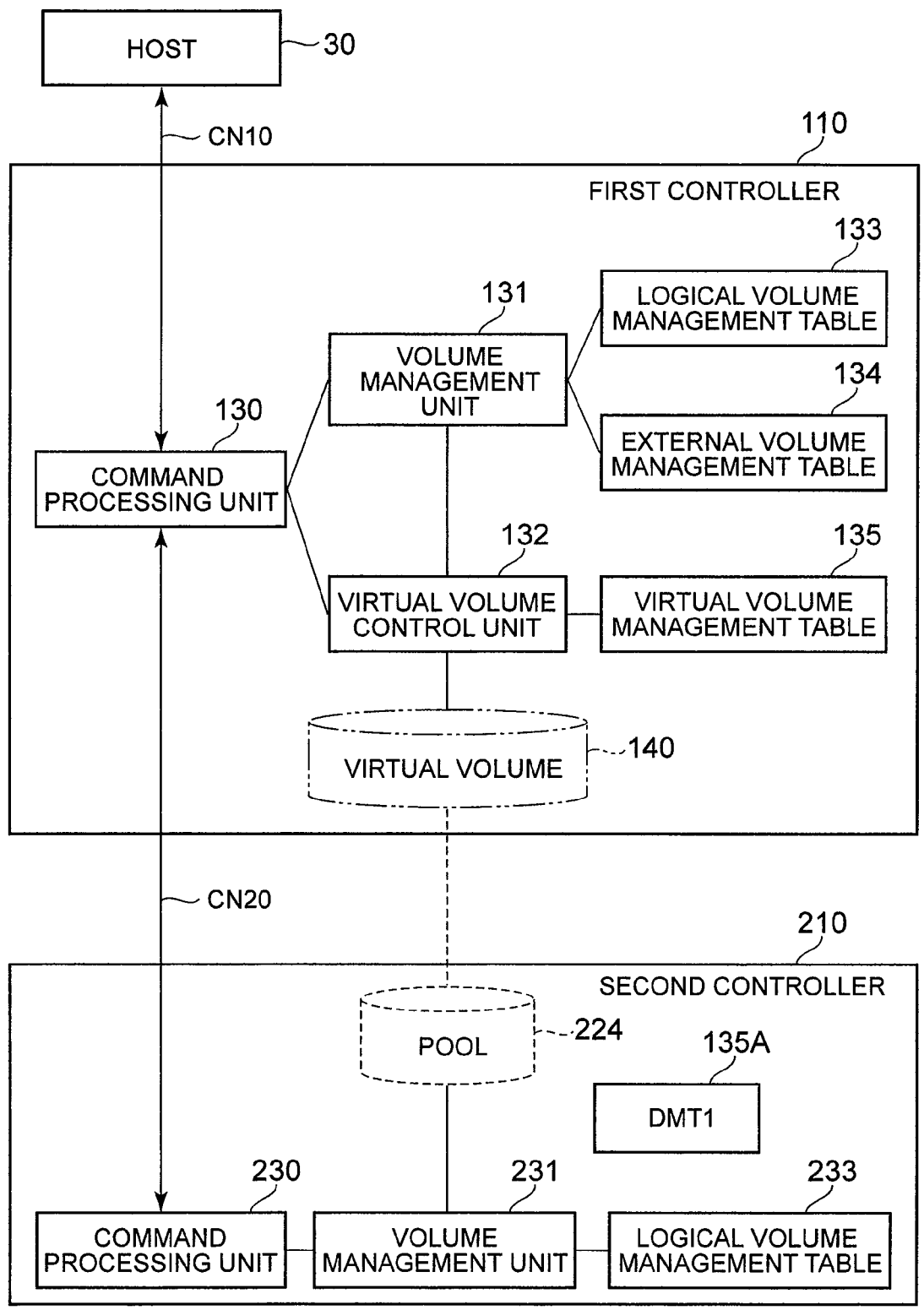
FIG. 3 is an explanatory diagram that schematically shows the functions of the controller.

More precisely, the virtual volume control unit 132 shown in FIG. 3 corresponds to the virtual volume control unit 6 shown in FIG. 1 and the volume management units 131 and 231 shown in FIG. 3 correspond to pool management units 4 and 9C in FIG. 1. Virtual volume management table 135 shown in FIG. 3 corresponds to DMT 5 in FIG. 1. The virtual volume 140 shown in FIG. 3 corresponds to the virtual volume 3 in FIG. 1.

The connection constitution will not be described. The host 30 and first storage control apparatus 10 are connected so as to be capable of two-way communication via a communication network CN10 such as an FC-SAN and IP network, for example. The first storage control apparatus 10 and second storage control apparatus 20 are also connected so as to be capable of two-way communication via a communication network CN20 such as an FC-SAN or IP-SAN. The management server 40 and first storage control apparatus 10 are connected so as to be capable of two-way communication via a communication network CN30 such as a LAN (Local Area Network), for example.

The connection constitution described above is an example and the present invention is not limited thereto. For example, the constitution may also be such that the first storage control apparatus 10, second storage control apparatus 20, host 30, and management server 40 are connected by using a communication network CN10. However, by disconnecting the communication network CN10 used for the I/O (Input/Output) which is employed in communications with the host 30 and the inter-device network CN20 which is used in data transfers and so forth between the respective storage control apparatuses 10 and 20, data transfers can be carried out between the respective storage control apparatuses 10 and 20 without burdening the host 30 or I/O network CN10.

The host 30 will now be described. The host 30 is constituted as a computer device such as a mainframe computer, a server computer, or a personal computer, for example, and comprises a processor and memory and so forth.

The host 30 comprises an application program 31 and a communication control unit 32. The application program 31 is a software product that accesses the virtual volume 140 in the first storage control apparatus 10 to read and write data. The communication control unit 32 is for communications with the storage control apparatus 10.

The management server 40 is a computer device for managing the various states of the first storage control apparatus 10 and setting the constitution of the first storage control apparatus 10. The management server 40 is able to set the communication path and volume via the service processor 116.

The constitution of the first storage control apparatus 10 will now be described. The first storage control apparatus 10 comprises a first controller 110 and a first storage unit 120, for example. The first storage control apparatus 10 is able to incorporate and use the real storage area of the second storage control apparatus 20 and, therefore, the first storage control apparatus 10 need not necessarily comprise the first storage unit 120.

The first controller 110 controls the overall operation of the first storage control apparatus 10. The first controller 110 comprises channel adapters 111, disk adapters 112, a cache memory 113, a shared memory 114, a connection control unit 115, and a service processor 116, for example. In the following description, the channel adapters will be called the 'CHA' and the disk adapters will be called the 'DKA'.

The CHA 111 are control substrates for communicating with an external device such as the host 30 and the second storage control apparatus 20. Each CHA 111 comprises at least one or more communication ports. Each communication port is configured with port identification information such as a WWN (World Wide Name) or IP address or the like.

In the example in FIG. 2, the first CHA 111 is connected to host 30 while the other CHA 111 is connected to the second storage control apparatus 20. The first CHA 111 receives a command that is issued by the host 30 and transmits the processing results of commands to the host 30. The other CHA 111 is a CHA for an external connection. The other CHA 111 issues a command to the second storage control apparatus 20 and receives the results of the processing of commands from the second storage control apparatus 20.

The DKA 112 is a control substrate for communicating with each storage device 121 in the first storage unit 120. The DKA 112 executes logical address/physical address conversion processing and processing required for a RAID constitution, for example.

The cache memory 113 is a memory for storing data which are received from the host 30 and the second storage control apparatus 20. Each cache area of the cache memory 113 is set to a free state, a clean state, or a datei state, for example. A free state is a state where the cache area is unused. A clean state is a state where data for which de-staging processing is complete are stored. A datei state is a state where de-staging processing for data stored in the cache area is incomplete.

The shared memory 114 stores various control information and management information which are used to control the operation of the storage control apparatus 10. The connection control unit 115 is constituted as a crossbar switch or the like, for example, and the respective CHA 111 and respective DKA 112 are connected to the cache memory 113 and shared memory 114.

A service processor 116 is connected to each CHA 111 via an internal network and collects various states in the storage control apparatus 10 via the respective CHA 111. Various states can include the rate of usage of the cache memory, for example.

The first storage unit 120 comprises a plurality of storage devices 121. A variety of storage devices such as hard disk devices and flash memory devices and so forth, for example, can be used as the storage devices.

Parity groups 122 can be formed by grouping the physical storage areas which the storage devices 121 comprise. The parity groups 122 are also virtual logical devices (VDEV) (described subsequently). The storage areas of the parity groups 122 can also be provided with at least one or more logical devices 123. The logical devices (LDEV in FIG. 2) 123 are associated with a LUN (Logical Unit Number) and supplied to the host 30.

The logical devices 123 are managed housed in the first pool 124. Although only one first pool 124 is illustrated for the sake of convenience, a plurality of pools 124 can be provided.

The logical devices are sometimes referred to as logical volumes in the following description. Further, the logical volumes generated on the basis of the physical storage areas of the storage devices 121 can be called real volumes. In contrast, the subsequently described virtual volumes 140 are formed by suitably gathering together storage areas (real storage areas) in one or a plurality of real volumes. The real volumes of the second storage control apparatuses 20 can also be called external volumes.

The second storage control apparatus 20 is constituted comprising a second controller 210 and a second storage unit 220, for example. Like the first controller 110, for example, the second controller 210 comprises a function to communicate with an external device (here, the first storage control apparatus 10 is the external device), a function to communicate with second storage unit 220, and a function to process commands received from the external device and transmit the processing result to the external device.

As per the first storage unit 120, the second storage unit 220 comprises a plurality of storage devices 221. A parity group 222 can be provided with at least one or more logical devices 223. Each logical device 223 is housed within the second pool 224.

FIG. 3 is a block diagram with a focus on the functional constitution. Management server 40 has been omitted from FIG. 3 and so forth. The first controller 110 implements the respective functions of a command processing unit 130, a volume management unit 131, and a virtual volume control unit 132, for example. The first controller 110 uses a logical volume management table 133, an external volume management table 134, and a virtual volume management table 135, for example. The first controller 110 generates a virtual volume 140 and supplies same to the host 30.

The command processing unit 130 processes commands which are received from the host 30 and transmits the processing results to the host 30. In addition, the command processing unit 130 transmits commands to the second storage control apparatus 20 and receives the processing result from the second storage control apparatus 20.

The volume management unit 131 corresponds to the 'real storage area management unit'. The volume management unit 131 is able to manage real volumes that exist inside and outside the first storage control apparatus 10 by using the logical volume management table 133 and external volume management table 134. The respective tables 133 and 134 will be described subsequently.

The virtual volume control unit 132 generates the virtual volume 140 by using the virtual volume management table 135 which constitutes the 'storage area management unit' and provides the host 30 with the virtual volume 140. In the following description, the virtual volume management table will sometimes be abbreviated as 'DMT'. The details of table 135 will be described subsequently.

The second controller 210 implements a command processing unit 230 and a volume management unit 231. The command processing unit 230 processes commands received from the first controller 110 and transmits the processing results to the first controller 110. The volume management unit 231 manages the real storage area in the second pool 224 by using a logical volume management table 233.

A copy 135A of the DMT 135 in the first controller 110 can also be saved in the second controller 210. The copy 135A of the DMT 135 is stored in the second pool 224. If, by any chance, the DMT 135 in the first storage control apparatus 10 is damaged so that the DMT 135 is then irreparable, the first controller 110 reads and uses the copy 135A of the DMT 135 in the second storage control apparatus 20.

FIG. 4 is an explanatory diagram of a logical volume management table 133. The logical volume management table 133 is a table for managing the real storage area in the pool. This table 133 associates and manages a logical device number (LDEV#) 1331, a volume type 1332, a virtual logical device number (VDEV#) 1333, a start address 1334, and a size 1335, for example.

The logical device number 1331 is information for identifying each of the respective logical devices 123. The volume type 1332 is information discriminating whether each of the logical devices 123 are internal volumes or external volumes. An internal volumes is a real volume that exists in the first storage control apparatus 10. The external volume is a real volume that exists in the second storage control apparatus 20.

The virtual logical device number 1333 is information for identifying a virtual logical device (parity group) 122. The start address 1334 indicates the start address of the logical device 123 set in the virtual logical device. The size 1335 indicates the size of the logical device 123.

The first controller 110 establishes where each logical device (real volume) is in a particular virtual logical device 122 by using logical volume management table 133 and is able to learn whether the logical devices exist inside or outside the first storage control apparatus 10.

The values indicated in the following drawings including FIG. 4 are each reference values and do not limit the scope of the present invention. The reference values in the respective drawings are used in the respective drawings and do not influence the other drawings.

FIG. 5 is an explanatory diagram of the external volume management table 134. The external volume management table 134 is used to access the real volumes 223 which exist in the second pool 224 of the second storage control apparatus 20.

The external volume management table 134 associates and manages the virtual logical device number 1341, connection port 1342, and external storage information 1343, for example. The virtual logical device number 1341 is information for identifying the virtual logical devices 122 in the first storage control apparatus 10. The connection port 1342 is information for specifying a communication port that is used to access the real volume 223 in the second storage control apparatus 20.

The external storage information 1343 is information for accessing the real volume 223 in the second storage control apparatus 20. The external storage information 1343 comprises LUN_C1, vendor name C2, device name C3, and volume ID_C4, for example.

The LUN_C1 is information indicating the LUN set for the real volumes 223 in the second storage control apparatus 20. The vendor name C2 indicates the manufacturing source of the second storage control apparatus 20. The device name C3 is information identifying the second storage control apparatus 20. The volume ID_C4 is information specifying the real volume 223 in the second storage control apparatus 20. The volume ID may also instead be called the volume number.

The first controller 110 is able to access the real volumes 223 in the second storage control apparatus 20 by using the external volume management table 134. The logical volume management table 133 and external volume management table 134 can also be combined as one table.

FIG. 6 is an explanatory diagram showing the virtual volume management table 135. The virtual volume management table 135 manages the constitution of the virtual volume 140. The virtual volume management table 135 associates and manages a virtual volume number 1351, a slot number 1352, an assignment flag 1353, a pool number 1354, and a slot number 1355, for example.

The virtual volume number 1351 is information for identifying the virtual volume 140. In this embodiment, only one virtual volume 140 is expediently shown but a plurality of virtual volumes 140 can be generated. The slot number 1352 is information for identifying the respective storage areas (virtual storage areas) which constitute the virtual volume 140.

In this embodiment, the constituent units of the virtual volumes and logical volumes are known as slots. That is, the respective volumes 140 are constituted as an aggregate of a plurality of slots. The constituent units may also be segments. In the following description, the slots of the virtual volumes 140 will sometimes be referred to as 'virtual slots' and the slots of the real volumes will sometimes be referred to as 'real slots'.

The assignment flag 1353 is information for identifying whether a real slot has been assigned to a virtual slot. In cases where a real slot has been assigned to a virtual slot, 'assigned' is set. In cases where a real slot has not been assigned to a virtual slot, 'unassigned' is set. In FIG. 6, assignment is expediently abbreviated as 'assigned' and 'non-assignment' is abbreviated as 'unassigned'.

The pool number 1354 is information for specifying the pool in which a real slot assigned to the virtual slot exists. The slot number 1355 is information for specifying the slot of the real volume, that is, the real slot.

The first controller 110 is able to grasp the assignment status of a real slot to a virtual volume 140 by using the virtual volume management table 135.

The operation of the storage system of this embodiment will be described on the basis of FIGS. 7 to 9. The respective flowcharts shown hereinbelow provide an overview of the respective processes to the extent required to understand and implement the present invention and sometimes differ from an actual computer program. A so-called person skilled in the art is able to make changes to the steps illustrated, add new steps, and delete existing steps, and so forth.

The host 30 issues a write command to write data to the virtual volume 140 (S10). The first controller 110 receives a write command (S11). The first controller 110 references the DMT 135 and judges whether a real slot has been assigned to the address (virtual slot number) designated as the write destination (S12).

In cases where a real slot has not been assigned to a virtual slot (S12: NO), the first controller 110 selects an unused real slot in the pool, assigns the selected real slot to the virtual slot of the write destination (S13), and updates the DMT 135 (S14).

The first controller 110 issues an update request to update the copy 135A of the DMT 135 which is held in the second storage control apparatus 20 (S15). Upon receipt of the update request from the first controller 110 (S16), the second controller 210 updates the copy 135A of the DMT 135 stored in the second pool 224 (S17) and reports the fact that the update is complete to the first controller 110 (S18). The first controller 110 receives a completion report from the second controller 210 (S19) and confirms that the copy 135A of the DMT 135 has been updated.

In cases where a real slot has been assigned to the write destination slot designated by the host 30 (S12: YES), S13 and so forth are skipped and the processing moves on to S20.

The first controller 110 secures the area of the cache memory 113 in order to receive write data (S20). The size of the write data which are subsequently transmitted is indicated by the write command received in S11. The first controller 110 prioritizes the selection of a free-state area among the respective areas of the cache memory 113. In cases where a free-state area does not exist and cases where the free-state area alone is inadequate, the first controller 110 selects a clean-state area. In cases where the clean-state area is inadequate, the first controller 110 sends back a 'busy' signal to the host 30.

When a cache area for receiving write data is secured (S20), the first controller 110 reports this fact to the host 30 (S21). The host 30 receives the report from the first controller 110 (S22) and transmits write data (S23).

The first controller 110 receives write data transmitted from the host 30 (S24) and stores the write data in the cache area secured in S20 (S25). The first controller 110 reports the fact that the processing of the write command is complete to the host 30 at the time the write data are stored in the cache memory 113 (S26). As a result of this report, the host 30 confirms the fact that the processing of the write command has ended normally (S27).

Thereafter, the first controller 110 executes de-staging processing (S28) and the write processing to write to the second storage control apparatus 20 (S29) given predetermined timing. In cases where a real slot that is assigned to the virtual volume 140 exists in the first pool 124 in S13, de-staging processing is performed (S28). In cases where the real slot assigned to the virtual volume 140 exists in the second pool 224 in S13, the write processing to write to the second storage control apparatus 20 (S29) is carried out.

As shown in the subsequent embodiment, in cases where the virtual volume 140 in the first storage control apparatus 10 and the virtual volume 240 in the second storage control apparatus 20 (See FIG. 10) form a copy pair, both de-staging processing (S28) and write processing to write to the second storage control apparatus 20 (S29) are executed.

Figure 7:
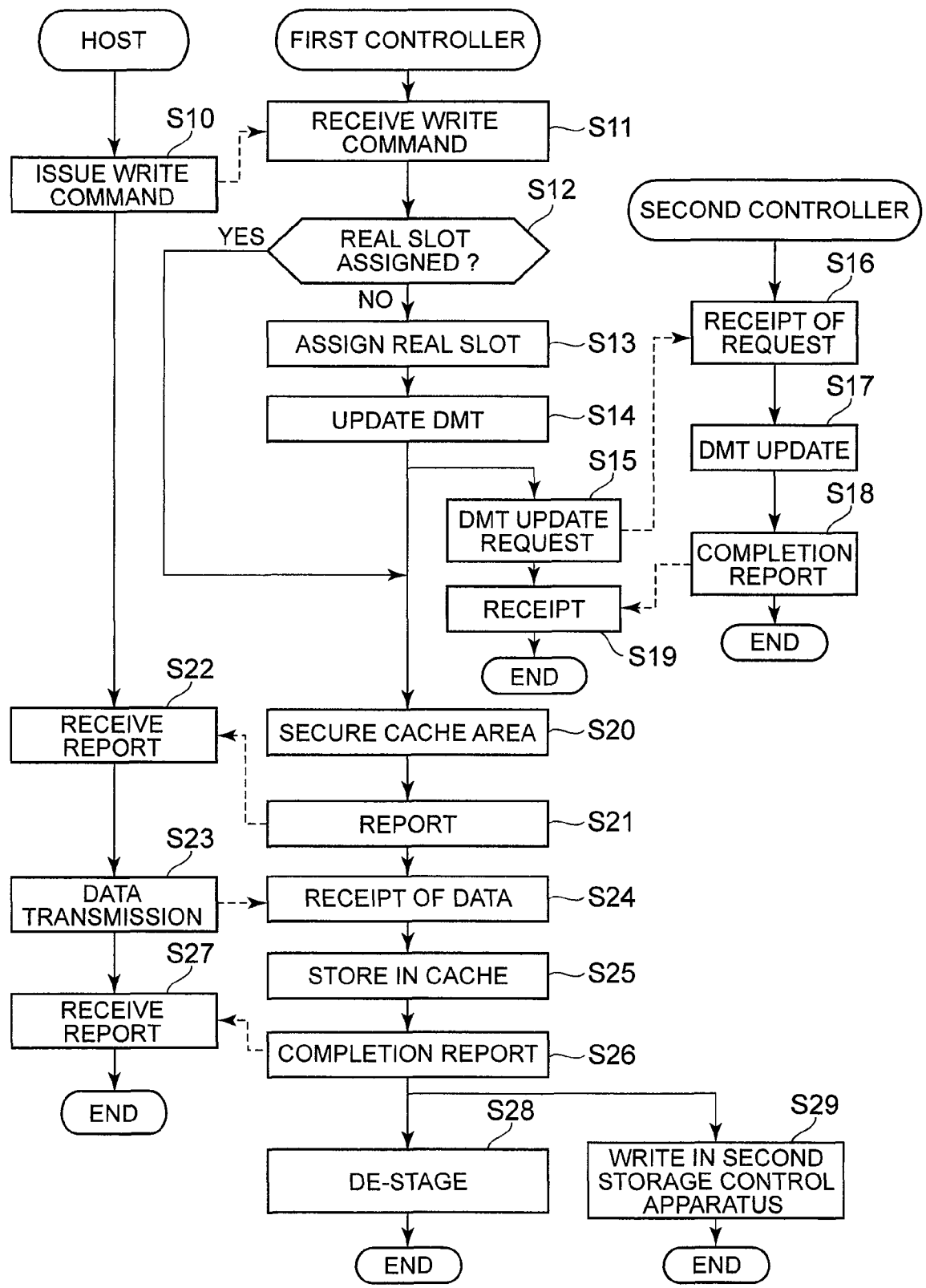
FIG. 7 is a flowchart that shows write processing that processes write commands from the host.

As shown in FIG. 7, in cases where the write command issued by the host 30 requests writing to a new virtual slot (S12: NO), the first controller 110 assigns a real slot to the new virtual slot (S13). In cases where the write command issued by the host 30 requests an update of the existing data (S12: YES), the first controller 110 does not assign a real slot to the virtual slot.

The first controller 110 updates the DMT 135 prior to de-staging the write data (S28, S29) in cases where a real slot has been assigned to the virtual slot designated as the write destination (S14). In addition, the first controller 110 requests an update of the copy 135A of the DMT 135 in the second storage control apparatus 20 prior to de-staging the write data (S15).

That is, in this embodiment, the write data are saved in the real slot after the DMT 135 in the first storage control apparatus 10 and the copy 135A of the DMT 135 in the second storage control apparatus 20 are both updated (S28, S29). As a result, the states of the DMT 135 and 135A can always be kept in the latest state.

Processing related to an update of the copy 135A of the DMT 135 (S15 to S19) can be executed parallel to the write-data-reception related processing (S20 to S26). Therefore, the first controller 110 is able to receive write data from the host 30 by securing the cache area prior to confirming the completion of the update of the copy 135A. However, as mentioned earlier, the timing with which the write data received from the host 30 are written to the real slot in the pool follows the timing for updating the DMT 135 and copy 135A. In this embodiment and in each of the subsequent embodiments, control is exercised so that the update state of the DMT is newer than the saving state of data in the pool.

In the de-staging processing (S28), the first controller 110 writes write data to the real slot assigned to the virtual slot. That is, the first controller 110 writes and stores write data in the storage device comprising the real slot assigned to the virtual slot.

Figure 8:
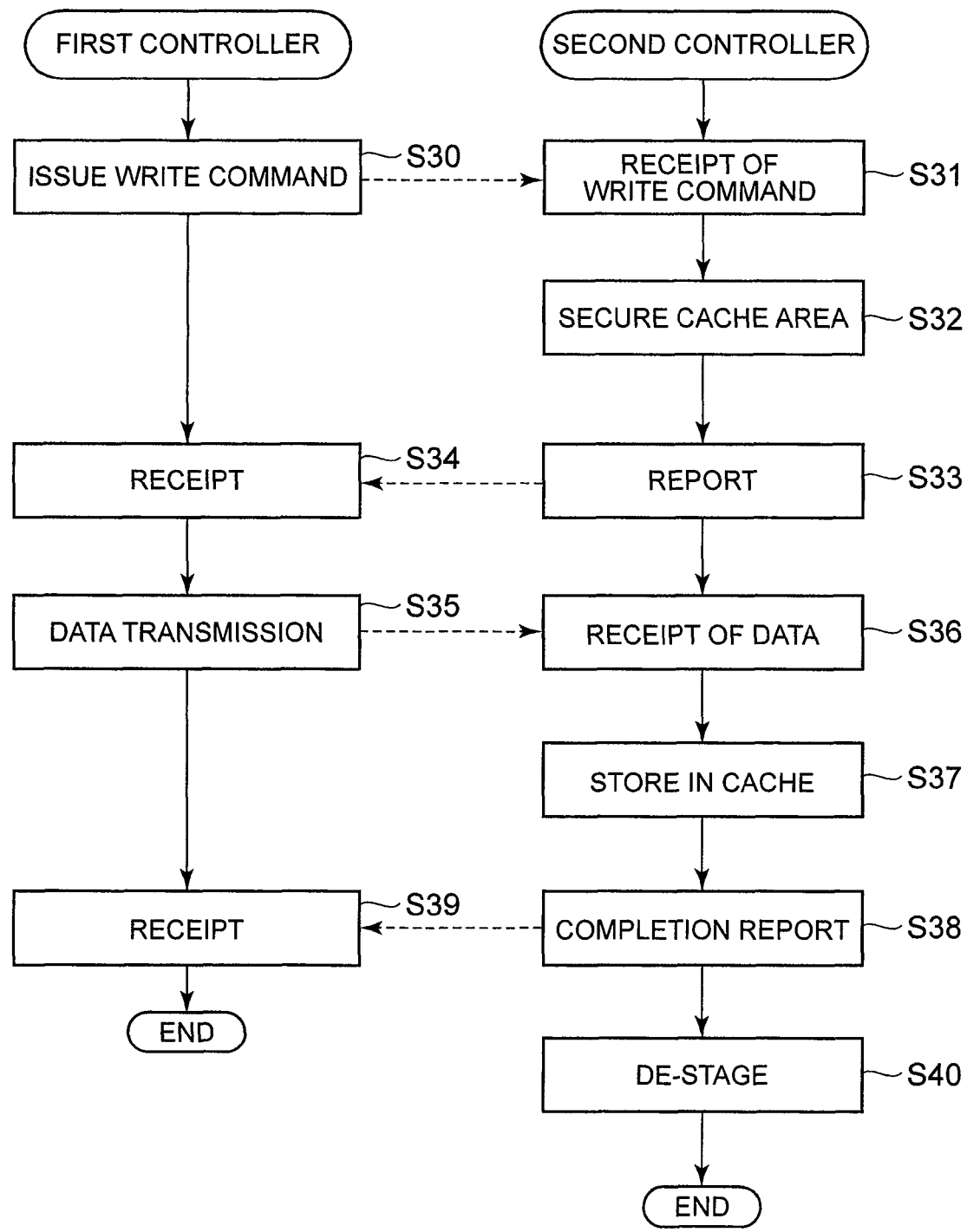
FIG. 8 is a flowchart that shows processing in which write data are transmitted from a first storage control apparatus to a second storage control apparatus for storage in the second storage control apparatus.

FIG. 8 is a flowchart showing the details of write processing to write to the second storage control apparatus 20 in FIG. 7 (S29). The first controller 110 executes write commands to the second controller 210 by using the DMT 135 and external volume management table 134 (S30).

Upon receipt of a write command from the first controller 110 (S31), the second controller 210 secures a cache area in order to receive write data which are transmitted from the first controller 110 (S32). Upon securing the cache area, the second controller 210 reports this fact to the first controller 110 (S33).

Upon receipt of the report from the second controller 210 (S34), the first controller 110 transmits the write data to the second controller 210 (S35). The second controller 210 receives write data which are transmitted by the first controller 110 (S36) and stores the write data in the cache area secured in S32 (S37).

When storing the write data in the cache area, the second controller 210 reports the fact that the write command processing is complete to the first controller 110 (S38). The first controller 110 confirms that the processing of the write command issued in S30 has ended normally by means of completion information from the second controller 210 (S39).

Thereafter, the second controller 210 writes write data stored in the cache area in S37 to the storage device 221 given predetermined timing (S40). The second controller 210 is also able to report the end of write command processing to the first controller 110 after completing de-staging processing (S40).

Figure 9:
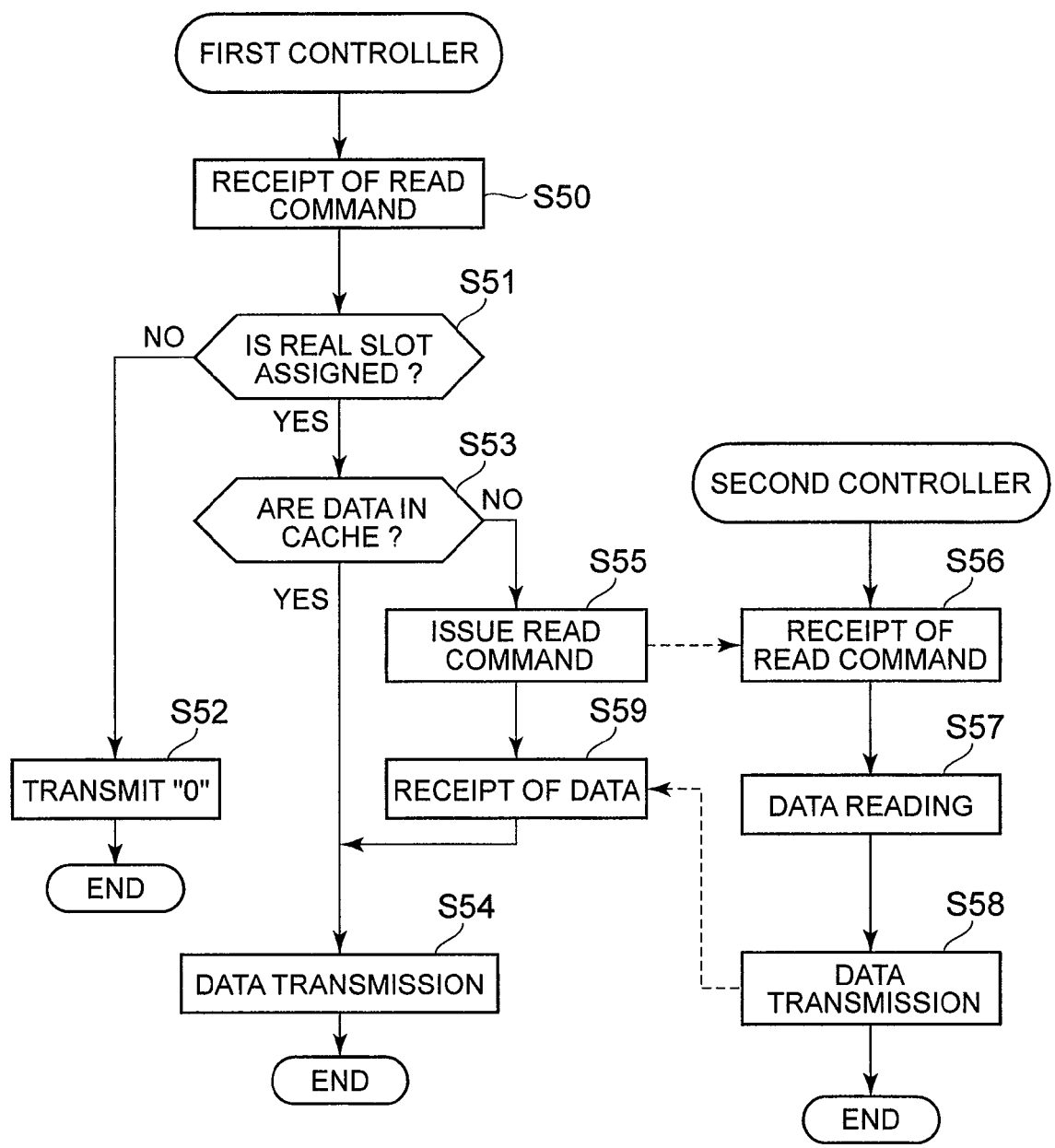
FIG. 9 is a flowchart that shows read processing for processing read commands from the host.

FIG. 9 is a flowchart that shows read processing. A case where a real slot in the second pool 224 has been assigned to the virtual slot of the virtual volume 140 will now be described.

The host 30 requests the reading of the data stored in the virtual volume 140. The first controller 110 receives a read command from the host 30 (S50). The read command includes a virtual volume number and the logical address of the reading destination (virtual slot number of the reading destination).

The first controller 110 judges whether the real slot has been assigned to the virtual slot of the reading destination designated by the read command (S51). In cases where a real slot has not been assigned to the virtual slot of the reading destination (S51: NO), the first controller 110 transmits a "0" to the host 30 (S52).

In cases where the real slot has been assigned to the virtual slot of the reading destination (S51: YES), the first controller 110 judges whether data for which reading is requested (read data) have been stored in the cache memory 113 (S53).

In cases where the data requested by the host 30 are stored in the cache memory 113 (S53: YES), the first controller 110 reads the data from the cache memory 113 and transmits same to the host 30 (S54).

In cases where the data requested by the host 30 are not stored in the cache memory 113 (S53: NO), the first controller 110 issues a read command to the second controller 210 (S55).

Upon receipt of the read command from the first controller 110 (S56), the second controller 210 reads the data from the real slot of the second pool 224 (S57) and transmits same to the first controller 110 (S58).

The first controller 110 receives data from the second controller 210 and stores same in the cache memory 113 (S59). Thereafter, the first controller 110 reads data stored in the cache memory 113 and transmits same to the host 30 (S54).

This embodiment affords the following effects on account of being constituted as described above. In this embodiment, as shown in FIG. 7, the DMT 135 and the copy of the DMT 135 are updated after assigning a real slot to the virtual slot, whereupon the write data are saved in a pool. Thereafter, the DMT 135 and DMT 135A can always be kept in the latest state. Therefore, a situation where a real slot that has already been assigned is re-assigned to another write command as a result of a DMT with old content can be prevented from arising and reliability improves.

In this embodiment, the DMT 135 is saved in the same pool 124 as the write data. Therefore, in comparison with a system where the DMT 135 is managed only in memory, the protection level of the DMT can be raised and the reliability of the storage control apparatus can be increased.

In this embodiment, the copy 135A of the DMT 135 is stored in the second storage control apparatus 20 and the DMT 135 in the first storage control apparatus 10 and the copy 135A in the second storage control apparatus 20 are synchronized. Therefore, even in cases where the DMT 135 in the first storage control apparatus 10 has failed, the virtual volume 140 can be controlled by using the copy 135A, whereby the reliability of the storage control apparatus improves.

In this embodiment, the first storage control apparatus 10 grasps the access path to the real slot which is being managed by the second pool 224 in the second storage control apparatus 20 (external volume management table 134) and a command which corresponds to the command from the host 30 is generated by means of the first storage control apparatus 10 and transmitted to the second storage control apparatus 20. As a result, in this embodiment, the first storage control apparatus 10 is able to utilize the real slot of the second storage control apparatus 20. Hence, the virtual volume 140 can be generated by effectively utilizing the storage area (second pool) of the second storage control apparatus 20 and user convenience improves.

Second Embodiment

The second embodiment will now be described on the basis of FIGS. 10 to 18. Each of the following embodiments including this embodiment corresponds to a modified example of the first embodiment. Descriptions which overlap with the first embodiment will be omitted hereinbelow. In this embodiment, a copy pair is formed by the first virtual volume 140 in the first storage control apparatus 10 and the second virtual volume 240 in the second storage control apparatus 20. Data are copied between the virtual volumes.

Figure 10:
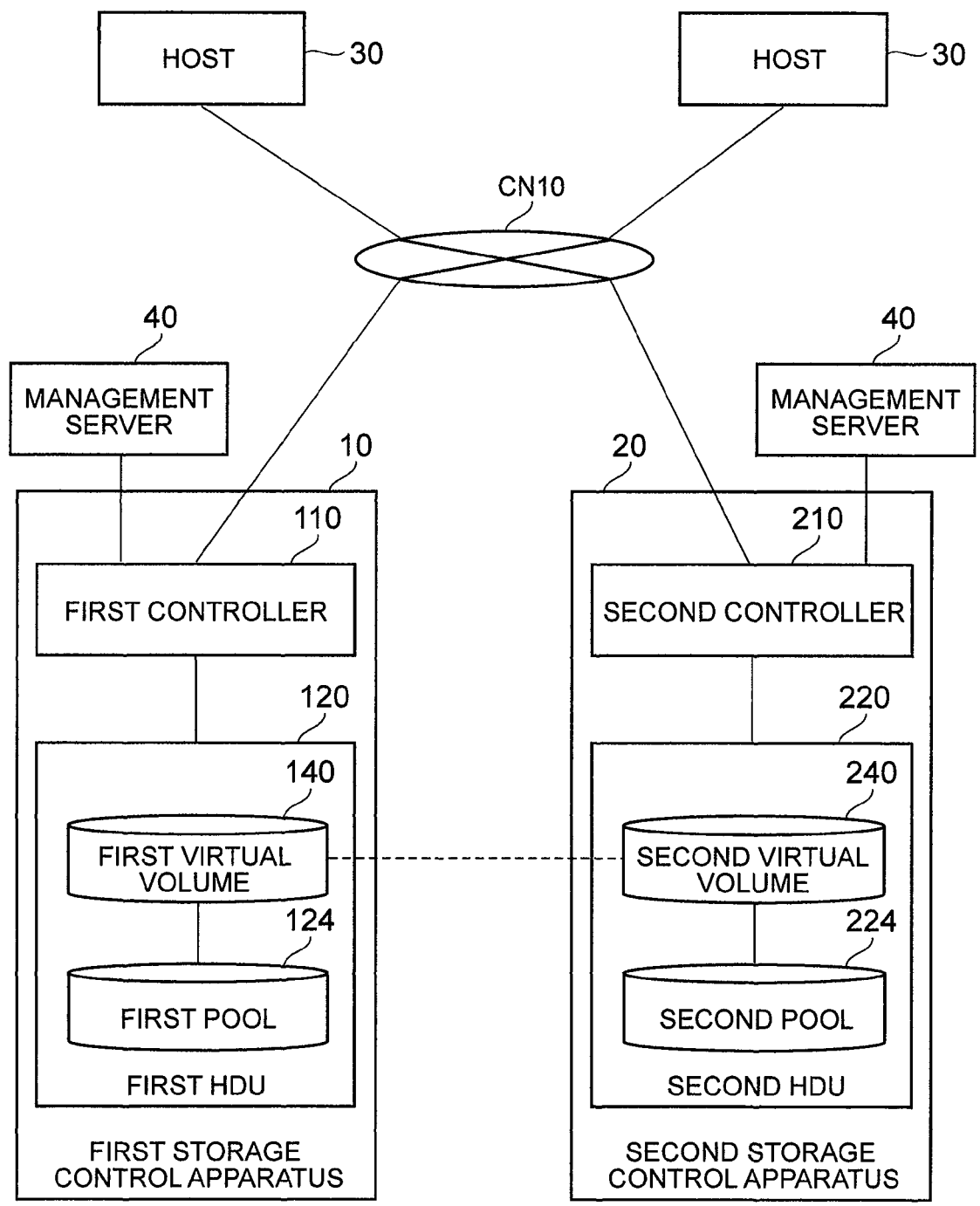
FIG. 10 is an explanatory diagram that shows the overall constitution of a storage system according to a second embodiment.

FIG. 10 is an overall constitutional view of the storage system according to this embodiment. The second storage control apparatus 20 of this embodiment comprises a second virtual volume 240. A real slot in the second pool 224 is assigned to the second virtual volume 240. The real slot in the first pool 124 is assigned to the first virtual volume 140 of the first storage control apparatus 10. The first virtual volume 140 and second virtual volume 240 form a copy pair and the stored content of the first virtual volume 140 is also stored in the second virtual volume 240. Constitutional changes and so forth to the second storage control apparatus 20 can be carried out by the management server 40 which is connected to the second storage control apparatus 20.

Figure 11:
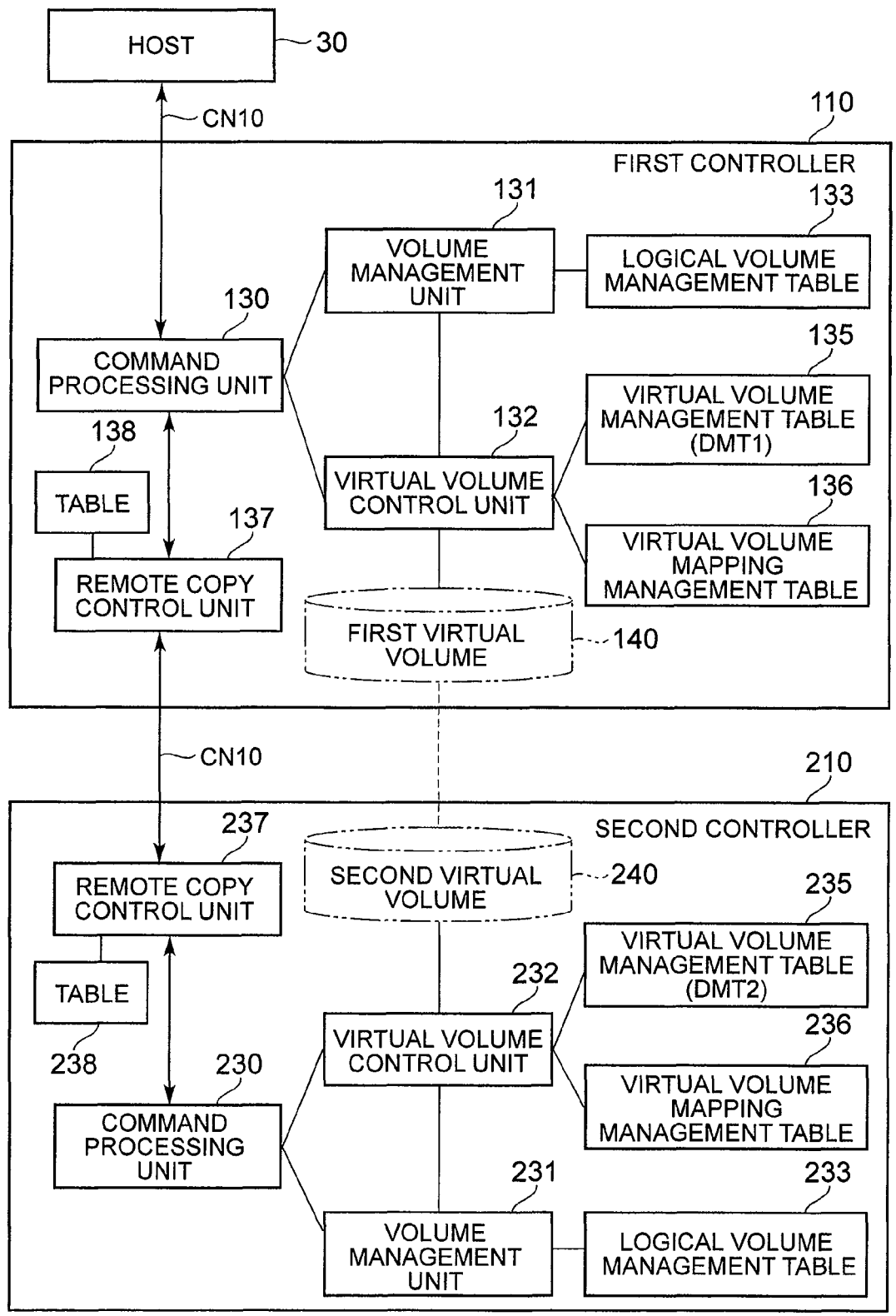
FIG. 11 is a block diagram that shows the functions of the controller.

FIG. 11 is a functional block diagram of this embodiment. The first controller 110 implements a command processing unit 130, a volume management unit 131, a virtual volume control unit 132, and a remote copy control unit 137, for example. The first controller 110 comprises a logical volume management table 133, a virtual volume management table 135, a virtual volume mapping management table 136, and a copy management table 138.

The remote copy control unit 137 controls the copying of data between the first storage control apparatus 10 and second storage control apparatus 20. Remote copies can be broadly categorized as copies between virtual volumes and copies between pools. In this embodiment, copies between virtual volumes will mainly be described and copies between pools will be described in subsequent embodiments. A remote copy is also called a remote copy.

The virtual volume mapping management table 136 is a table for managing the relationship between the first virtual volume 140 and second virtual volume 240. The details of the virtual volume mapping management table 136 will be provided subsequently.

The copy management table 138 is a table for managing copies between the first storage control apparatus 10 and second storage control apparatus 20. The copy management table 138 can also be constituted as an inter-controller copy management table 138A and/or a copy management bitmap 138B, as shown in FIG. 13.

In the case of a copy between virtual volumes described in this embodiment, it is possible to manage which virtual slot of the first virtual volume 140 is updated and which virtual slot among the virtual slots updated by the first virtual volume 140 is stored in the second virtual volume 240. Therefore, in this embodiment, it is not necessary to employ the inter-controller copy management table 138A shown in FIG. 13.

The second controller 210 implements a command processing unit 230, a volume management unit 231, a virtual volume control unit 232, and a remote copy control unit 237, for example. The second controller 210 comprises logical volume management table 233, a virtual volume management table 235, a virtual volume mapping management table 236, and a copy management table 238.

The functions of the second controller 210 and the description of the table will be omitted since these functions and the table are the same as those in the first embodiment and can be easily understood from the description of the first controller 110.

FIG. 12 shows the constitution of the virtual volume mapping management table 136. The virtual volume mapping management table 136 associates and manages a primary device number 1361, a virtual volume number 1362, a slot number 1363, a secondary device number 1364, a virtual volume number 1365, and a slot number 1365, for example.

The primary device number 1361 is information for specifying the storage control apparatus constituting the primary device. In this embodiment, the first storage control apparatus 10 is the primary device. The virtual volume number 1362 is information for specifying the copy source virtual volume. In this embodiment, the first virtual volume 140 is the copy source virtual volume. The slot number 1363 is information for identifying the respective virtual slots of the copy source virtual volume. That is, the slot number 1363 specifies the copy source virtual storage area.

The secondary device number 1364 is information for specifying the storage control apparatus constituting the secondary device. In this embodiment, the second storage control apparatus 20 is the secondary device. The virtual volume number 1365 is information for specifying the copy destination virtual volume. In this embodiment, the second virtual volume 240 is the copy destination virtual volume. The slot number 1366 is information discriminating the respective virtual slots of the copy destination virtual volume. The slot number 1366 specifies the copy destination virtual storage area.

FIG. 13 is an explanatory diagram showing an example of the copy management table 138. The inter-controller copy management table 138A shown at the top of FIG. 13 will be used in the subsequent embodiments. The inter-controller copy management table 138A is used in cases where data are copied between the first pool 124 and second pool 224.

The inter-controller copy management table 138A associates and manages a primary device number 1381, group number 1382, logical device number 1383, logical address 1384, secondary device number 1385, group number 1386, logical device number 1387, and logical address 1388, for example.

The primary device number 1381 is information for specifying the storage control apparatus which constitutes the copy source. The group number 1382 is information for specifying the copy source group. Data which are updated at the same time belong to the same copy group. As a result, data for which conformity is to maintained can be copied at the same time.

The logical device number 1383 is information for specifying the real volume of the copy source. The logical address 1384 indicates the start address of the copy source data stored in the real volume of the copy source.

The secondary device number 1385 is information for specifying the storage control apparatus constituting the copy destination. The group number 1386 is information specifying the copy destination group. The logical address number 1387 is information specifying the real volume of the copy destination. The logical address 1388 indicates the start address of the copy destination data.

The copy management bitmap 138B shown at the bottom of FIG. 13 is a management table for managing the copied slots.

Figure 14:
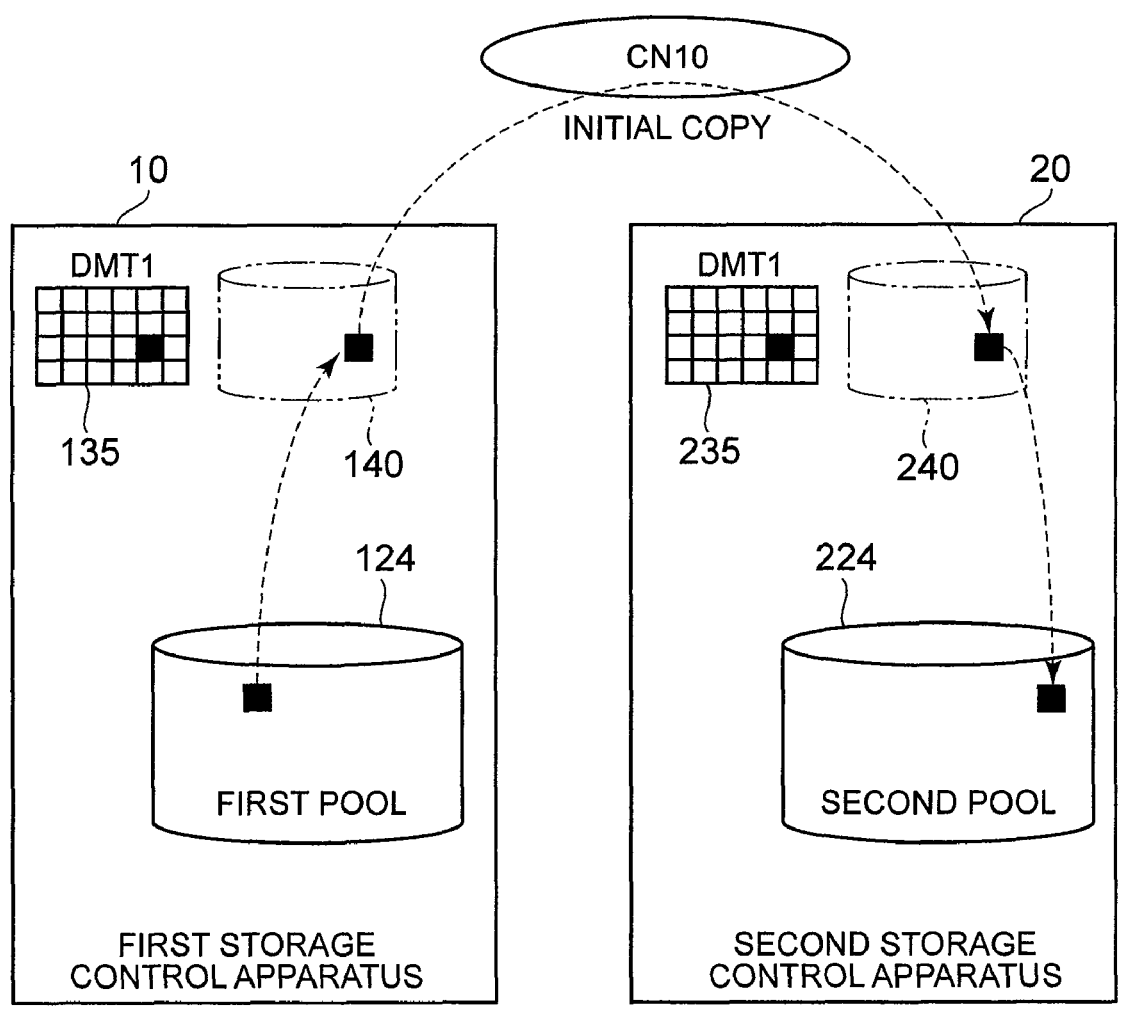
FIG. 14 is an explanatory diagram that shows an aspect in which an initial copy is made by means of a volume copy from the first storage control apparatus to the second storage control apparatus.

FIG. 14 is an explanatory diagram showing an aspect in which all of the stored content of the first virtual volume 140 is initially copied to the second virtual volume 240. The details will be described subsequently but the first storage control apparatus 10 reads data in order from all of the virtual slots of the first virtual volume 140 and transmits the data to the second storage control apparatus 20.

The substance of the data stored in the virtual volume 140 exists in the first pool 124 and, therefore, the data read from the first pool 124 are stored in the cache memory 113 and are transmitted from the cache memory 113 to the second storage control apparatus 20.

Upon receipt of the data from the first storage control apparatus 10, the second storage control apparatus 20 assigns an unused slot in the second pool 224 to a virtual slot of the second virtual volume 240 and stores the data received from the first storage control apparatus 10 in the real slot thus assigned.

Figure 15:
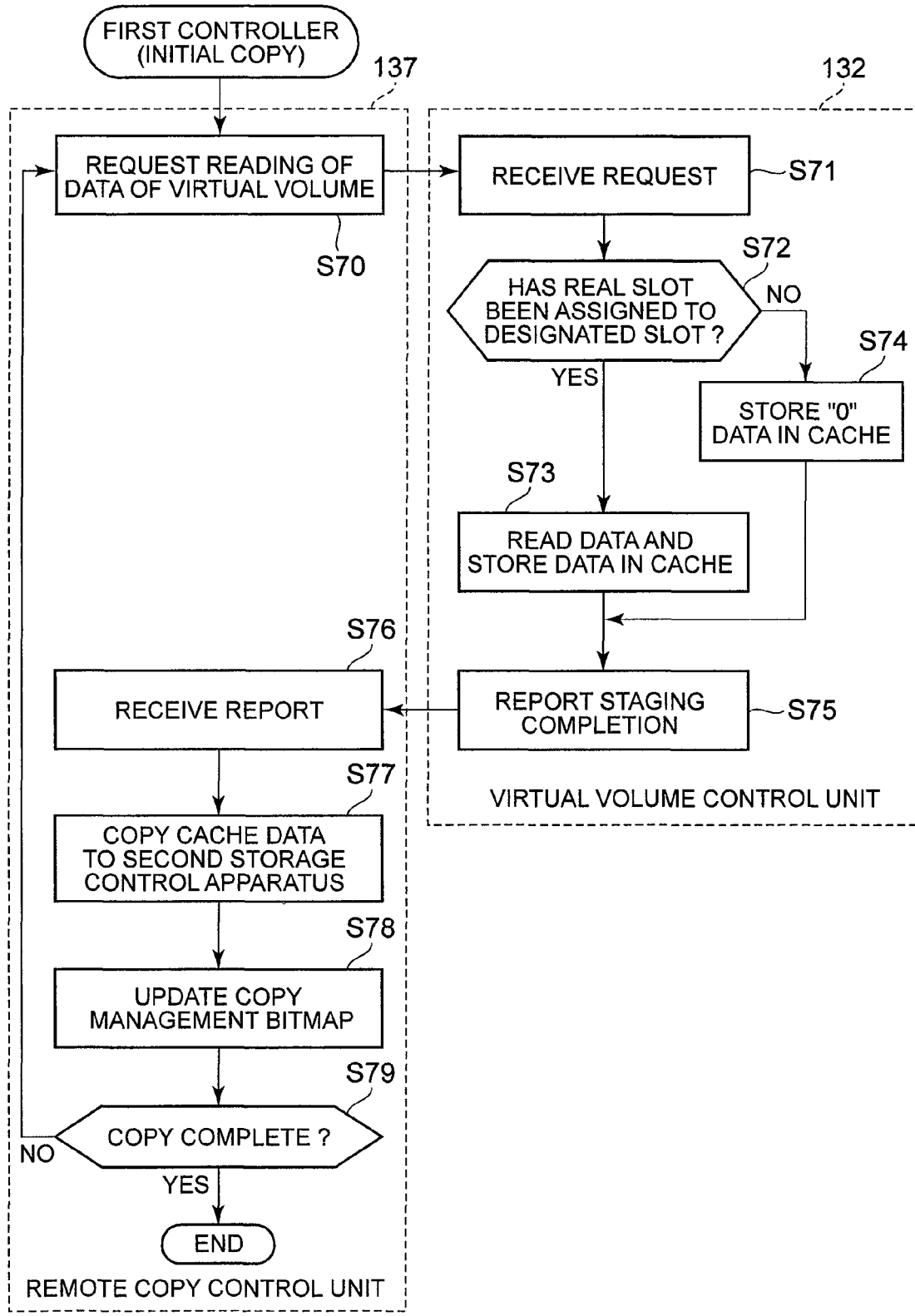
FIG. 15 is a flowchart that shows processing in which the first storage control apparatus transmits data in volume units to the second storage control apparatus.

FIG. 15 shows initial copy processing which is executed by the first controller 110 constituting the copy source. This processing is executed through collaboration between the remote copy control unit 137 and virtual volume control unit 132. The remote copy control unit 137 is charged with S70 and S76 to S79. The virtual volume control unit 132 is charged with S71 to S75.

In the initial copy processing, processing to read data from the first virtual volume 140 is executed by the copy source storage control apparatus 10 and processing to write data to the second virtual volume 240 is executed by the copy destination storage control apparatus 20.

The remote copy control unit 137 issues a request to the virtual volume control unit 132 to read data from the designated virtual slot (S70). When the virtual volume control unit 132 receives the request of S70 (S71), it is judged whether a real slot has been assigned to the designated virtual slot (S72).

In cases where a real slot has been assigned to the virtual slot for which data reading is designated (S72: YES), the virtual volume control unit 132 reads data from the real slot and stores same in the cache memory 113 (S73). The virtual volume control unit 132 issues a report to the effect that staging processing is complete to the remote copy control unit 137 (S75).

In cases where a real slot has not been assigned to the virtual slot for which data reading is designated (S72: NO), the virtual volume control unit 132 stores "0" data in the cache memory 113 (S74).

Upon receipt of a report to the effect that staging processing is complete (S76), the remote copy control unit 137 copies the data stored in the cache memory 113 by transferring the data to the second storage control apparatus 20 (S77). The remote copy control unit 137 designates the slot number and transmits the data stored in the slot to the second storage control apparatus 20.

The remote copy control unit 137 updates the copy management bitmap 138B with respect to the virtual slot whose data have been transmitted to the second storage control apparatus 20 (S78) and judges whether the copying of all the virtual slots of the first virtual volume 140 is complete (S79). In cases where there is a virtual slot that has not yet been copied (S79: NO), the steps S70 to S78 are repeated. When a copy to the second storage control apparatus 20 is complete for the whole first virtual volume 140 (S79: YES), this processing ends.

Figure 16:
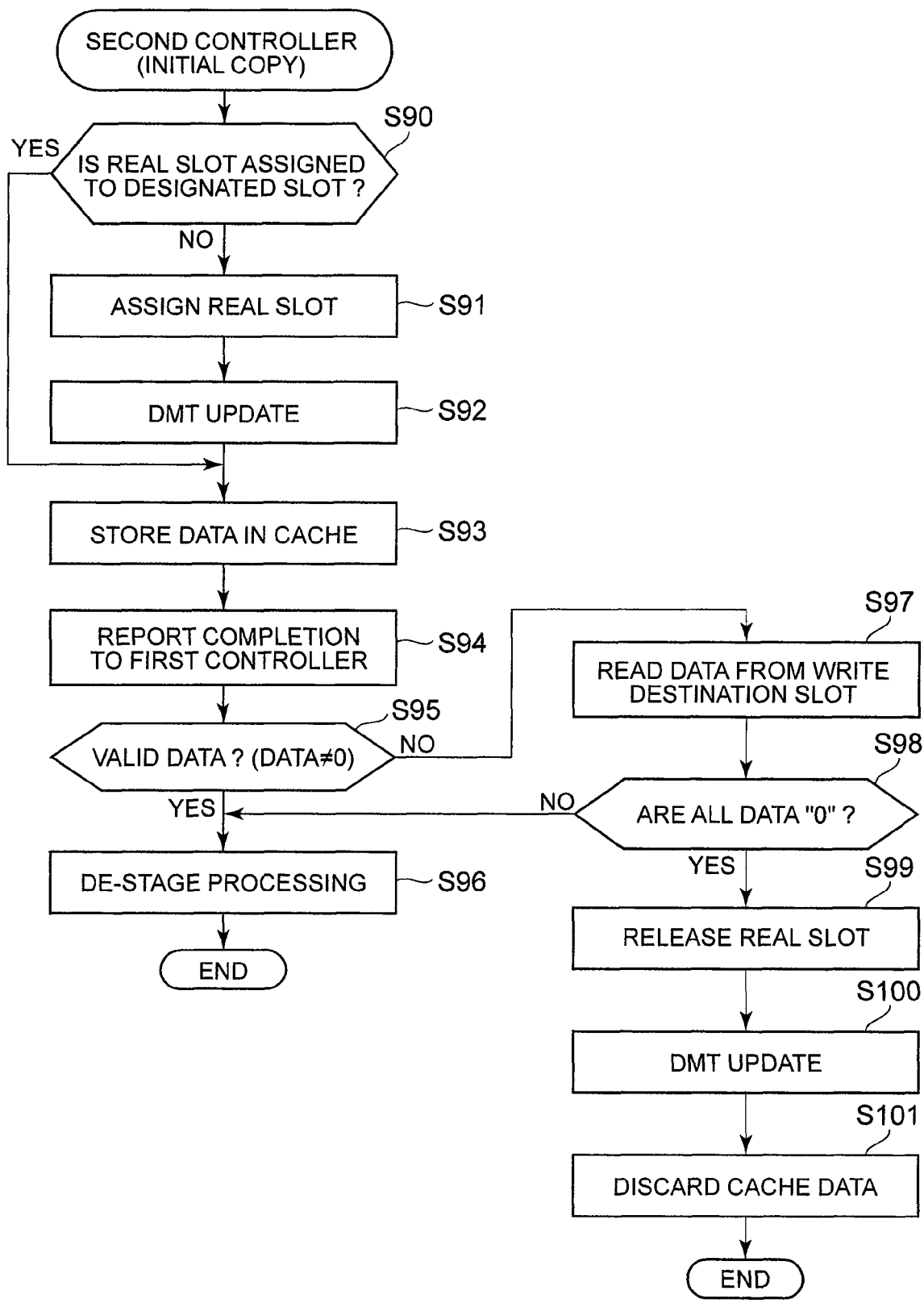
FIG. 16 is a flowchart that shows processing in which the second storage control apparatus receives data in volume units from the first storage control apparatus and stores the received data.

FIG. 16 is a flowchart that shows initial copy processing that is executed by the second controller 210 which is the copy destination. This processing is executed by the virtual volume control unit 232 of the second controller 210.

The second controller 210 judges whether a real slot has been assigned to the virtual slot designated by the first controller 110 (S90). In cases where a real slot has not been assigned to the designated virtual slot (S90: NO), the second controller 210 selects an unused real slot in the second pool 224 and assigns the real slot thus selected to the designated virtual slot (S91). The second controller 210 updates second DMT 235 which manages the constitution of the second virtual volume 240 (S92).

In cases where a real slot has been assigned to the designated virtual slot (S90: YES), S91 and S92 are skipped and the processing moves to S93.

The second controller 210 stores the data received from the first controller 110 in the cache memory in the second controller 210 (S93) and reports the fact that processing of the write command is complete to the first controller 110 (S94).

The second controller 210 judges whether the data received from the first controller 110 is valid data (S95). 'Valid data' signifies data which do not entirely consist of "0" data. 'Data which are not valid' means invalid data and 'invalid data' signifies "0" data.

As shown in S74 in FIG. 15, in the first virtual volume 140 of the copy source, "0" data are transmitted to the second storage control apparatus for virtual slots to which a real slot has not been assigned. Therefore, the data which the second controller 210 receives from the first controller 110 are a mix of valid data and invalid data. The second controller 210 then judges whether the received data are valid data (S95).

In the case of valid data (S95: YES), the second controller 210 performs de-staging processing with suitable timing (S96). That is, the second controller 210 stores data received from the first controller 110 in the storage device 221 which has a real slot assigned to the virtual slot in S91.

In cases where invalid data are received from the first controller 110 (S95: NO), the second controller 210 reads data from the real slot selected in S91 as the data write destination (S97). That is, the second controller 210 reads old data which are already stored in the real slot prior to writing data received in S93 to the real slot selected in S91.

The second controller 210 judges whether the data stored in the real slot selected in S91 are invalid data (S98). In cases where the data which are already stored are valid data (S98: NO), the second controller 210 moves to S96 and performs de-staging processing on the data received in S93. That is, in cases where the old data are valid data (S98: NO), the old data are overwritten with the new data (S96).

In cases where the old data are invalid data (S98: YES), the second controller 210 releases the real slot selected in S91 (S99), returns to an unused state (unassigned state), and updates the second DMT 235 (S100). In addition, the second controller 210 discards data which are stored in the cache memory in S93 (S101) and ends the processing.

That is, in cases where invalid old data have not been written to the real slot selected as the write destination (S98: YES), the second controller 210 ends the processing without writing the data received from the first controller 110 to the second virtual volume.

As a result of the processing shown in FIG. 16, even in cases where a volume is copied from the first virtual volume 140 to the second virtual volume 240, the second storage control apparatus 20 does not assign a real slot to all of the virtual slots of the second virtual volume 240. The second storage control apparatus 20 assigns the real slots to the virtual slots of the second virtual volume 240 for only the part which is used in the first virtual volume 140. Therefore, the second virtual volume 240 can be generated by effectively using the real slots managed by the second pool 224 of the second storage control apparatus 20.

In addition, because invalid data are rapidly revoked from the cache memory in the second controller 210, the cache memory can be efficiently used.

An initial copy in volume units from the first virtual volume 140 to the second virtual volume 240 described in FIGS. 14 to 16 can be used in restore processing from the second virtual volume 240 to the first virtual volume 140.

Figure 17:
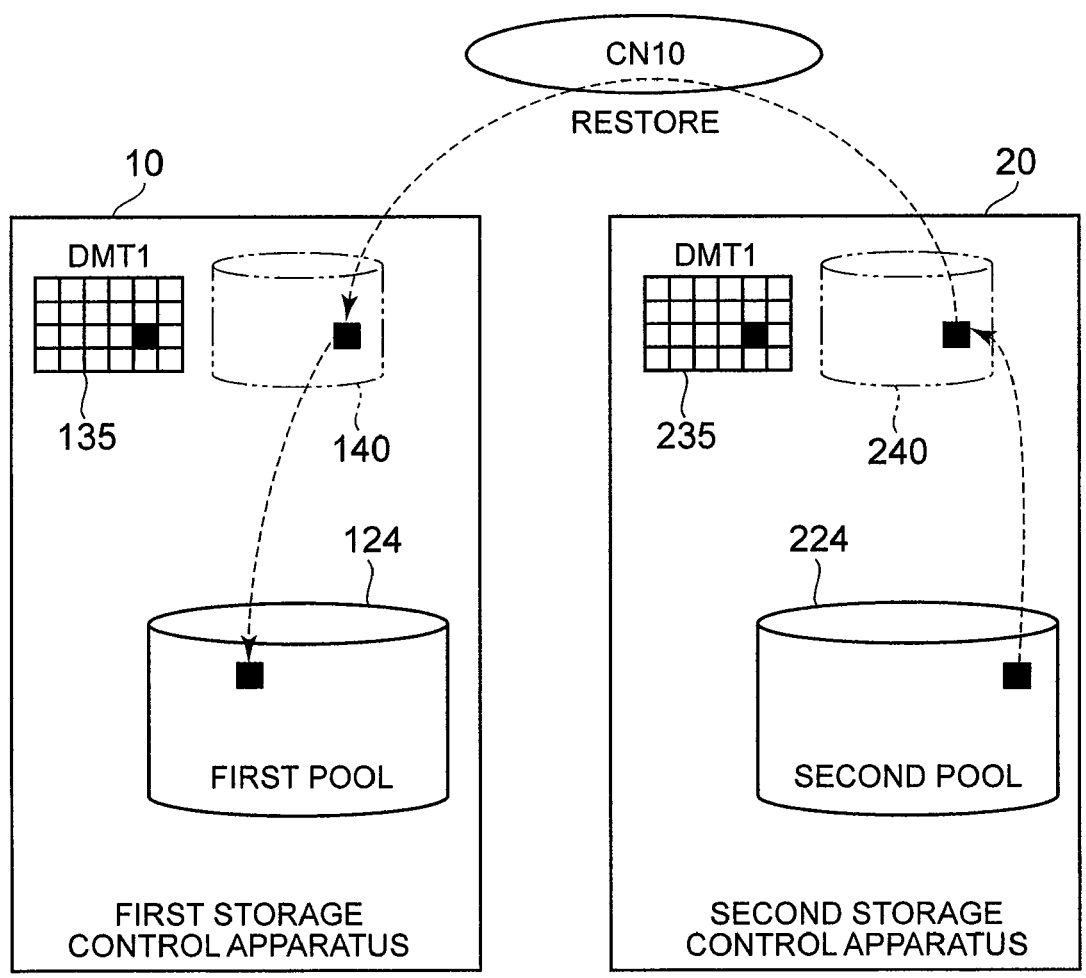
FIG. 17 is an explanatory diagram for a case where a restore is performed using the stored content of the second storage control apparatus.

FIG. 17 is an explanatory diagram of an aspect in which the stored content of the second virtual volume 240 is restored by writing the stored content to the first virtual volume 140. In restore processing, the relationship between the copy source and copy destination of the initial copy is reversed. That is, in restore processing, the copy source storage control apparatus is the second storage control apparatus 20 and the copy destination storage control apparatus is the first storage control apparatus 10.

Figure 18:
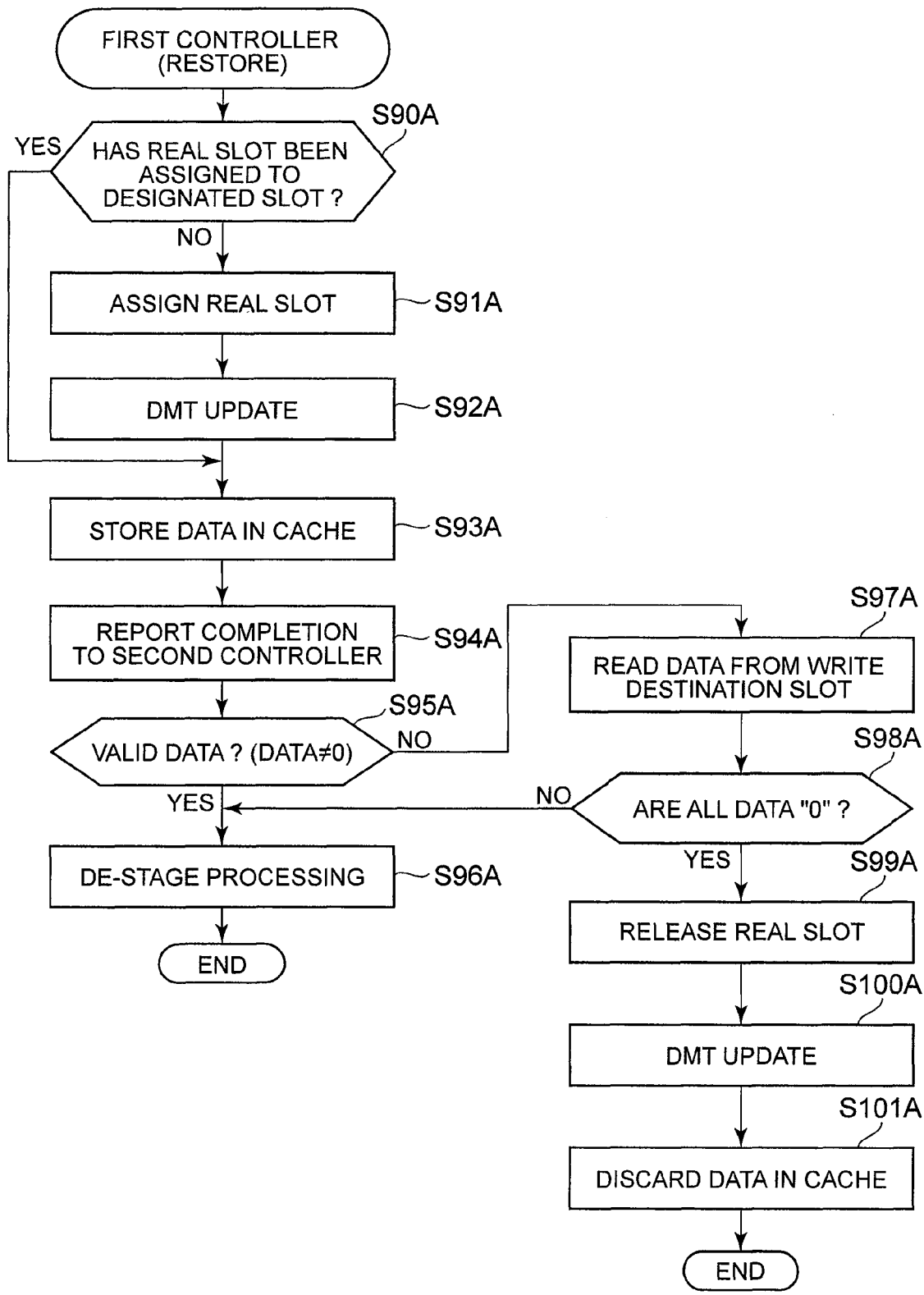
FIG. 18 is a flowchart that shows the restore processing of the first storage control apparatus.

FIG. 18 is a flowchart of the restore processing that is executed by the first controller 110. This processing is carried out in the same way as the initial copy shown in FIG. 16. S90A to S101A in FIG. 18 correspond to S90 to S101 in FIG. 16 and a description thereof is therefore omitted.

During restore processing, the first controller 110 which is the copy destination discriminates the validity of the received data (S95A) and prevents invalid data from being written to the first virtual volume 140. As a result, it is possible to prevent the assignment of the real slots in the first pool 124 to all of the virtual slots of the first virtual volume 140.

This embodiment so constituted also affords the same effects as those of the first embodiment. In addition, in this embodiment, in cases where the whole volume is copied (at the time of an initial copy and restore, for example), the virtual volume can be generated by effectively using the real slots in the pool without assigning real slots to the unused virtual slots.

Third Embodiment

Figure 19:
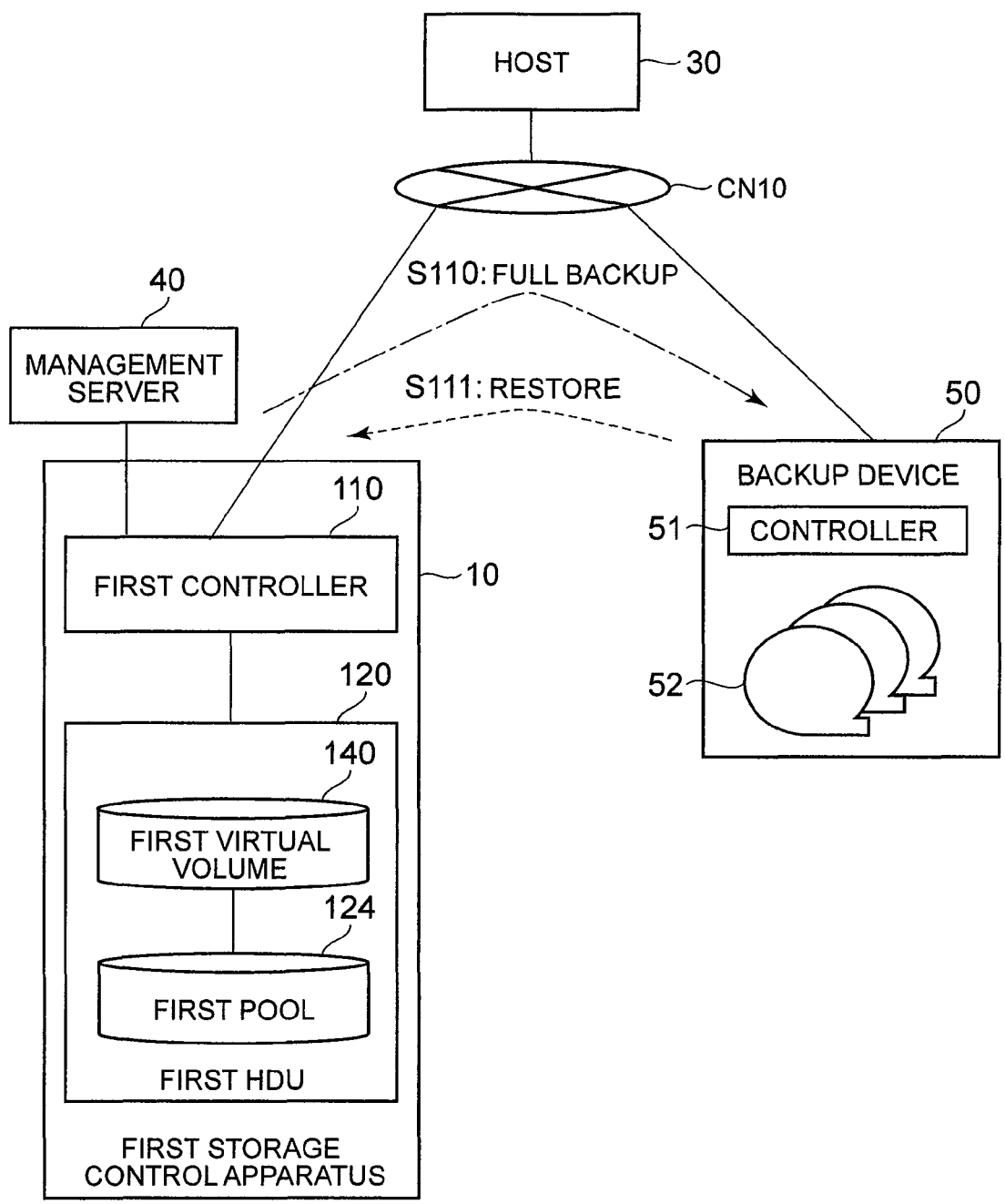
FIG. 19 is an explanatory diagram that shows the overall constitution of the storage system according to a third embodiment.

The third embodiment will now be described on the basis of FIG. 19. In this embodiment, a backup device 50 is used in place of the second storage control apparatus 20. The backup device 50 comprises a controller 51 and a backup storage device 52, for example. The backup storage device 52 is constituted as a magnetic tape device and a hard disk device, for example. The controller 51 controls the operation of the backup storage device 52.

The data which are stored in the first virtual volume 140 are copied to the backup device 50 at the designated backup time (S110). During the restore, the data stored in the backup device 50 are written to the first virtual volume 140 (S111).

A copy from the first storage control apparatus 10 to the backup device 50 (S110) can be performed in the same manner as the processing shown in FIG. 15. A copy from the backup device 50 to the first storage control apparatus 10 can be executed in the same way as the processing shown in FIG. 17. This embodiment so constituted also affords the same effects as those of the first and second embodiments.

Fourth Embodiment

The fourth embodiment will now be described on the basis of FIGS. 20 to 24. This embodiment shows an example in which the stored content of the first virtual volume 140 and second virtual volume 240 are synchronized by copying data from the first pool 124 of the first storage control apparatus 10 to the second pool 224 of the second storage control apparatus 20. That is, in this embodiment, a block level copy is made using the pools which store the data rather than performing a volume copy using the virtual volumes.

Figure 20:
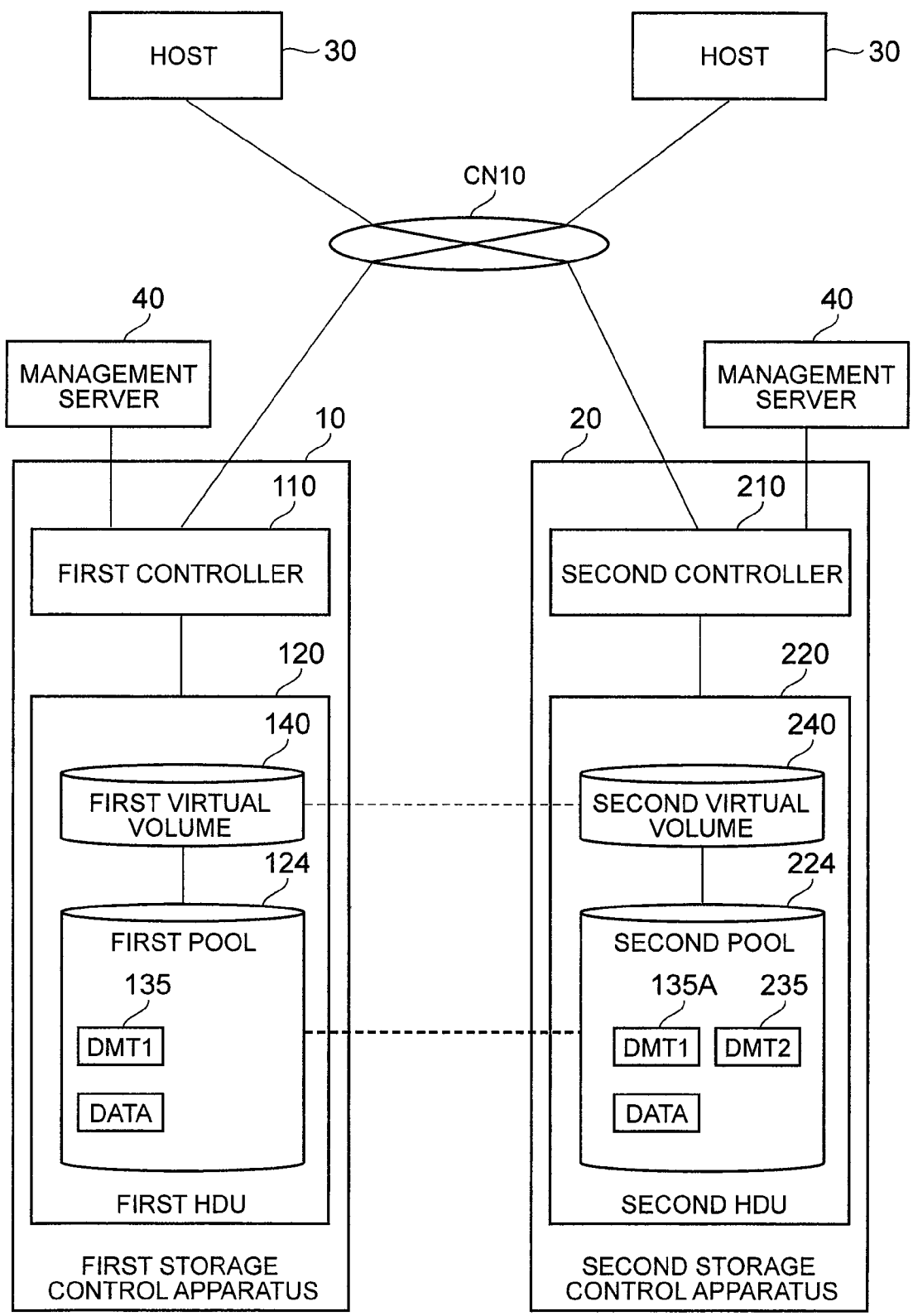
FIG. 20 is an explanatory diagram that shows the overall constitution of the storage system according to a fourth embodiment.

FIG. 20 is an overall constitutional view of the storage system of this embodiment. In this embodiment, the first pool 124 and second pool 224 form a copy pair. The copy 135A of the first DMT 135 and the second DMT 235 are stored in the second pool 224.

Figure 23:
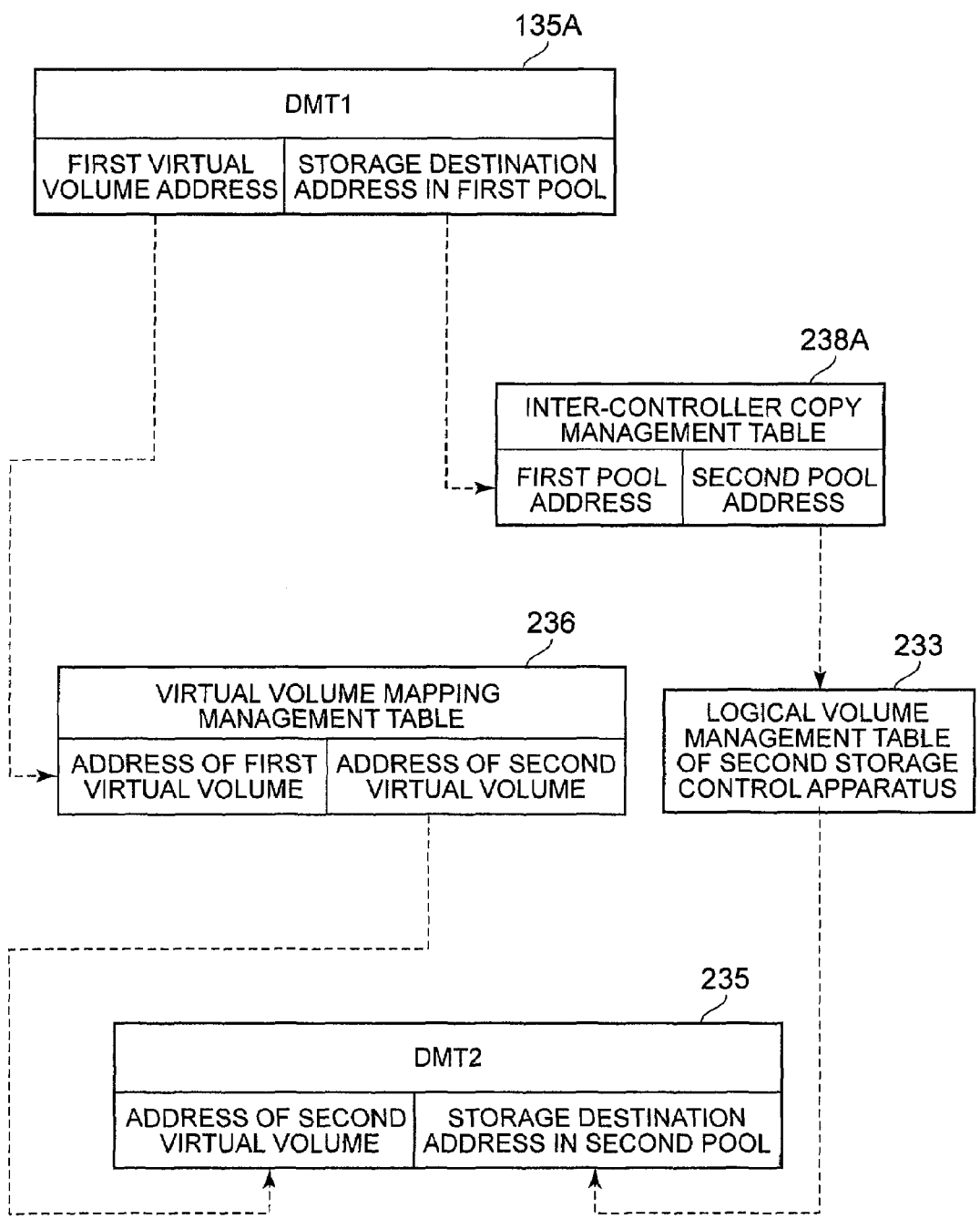
FIG. 23 is an explanatory diagram that shows a method for updating the second DMT on the basis of the results of updating the second pool.

Although omitted from FIG. 20, the respective tables 135A, 233, 235, 236, and 238 are stored in the second pool 224 of the second storage control apparatus 20, as shown in FIG. 23. The inter-controller copy management table 238A is constituted in the same manner as the inter-controller copy management table 138A shown in FIG. 13.

Figure 21:
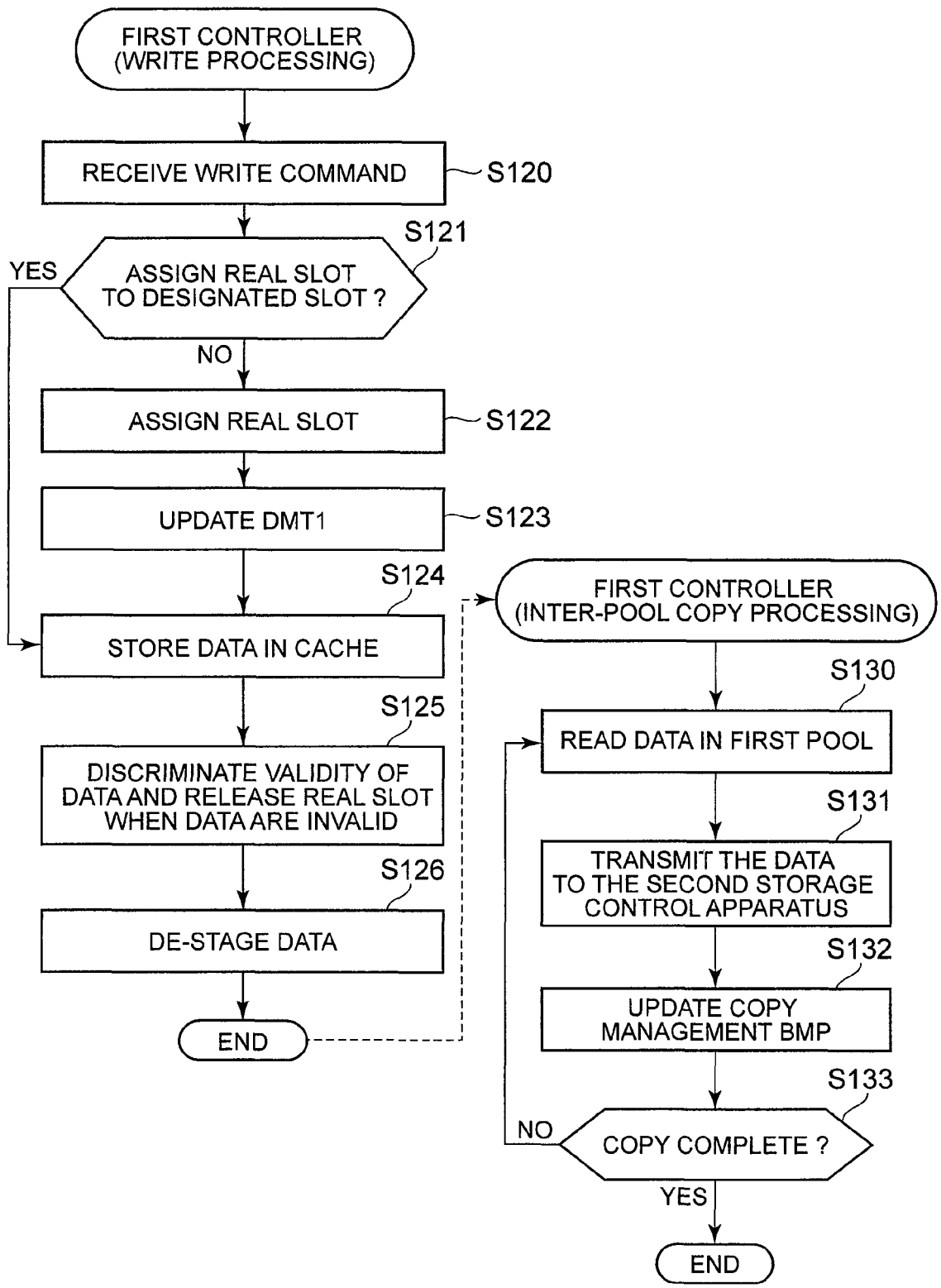
FIG. 21 is a flowchart that shows write processing and remote copy processing from a first pool to a second pool.

FIG. 21 is a flowchart showing write processing that is executed by the first controller 110. Upon receipt of a write command that is issued by the host 30 (S120), the first controller 110 judges whether a real slot has been assigned to the virtual slot designated by the write command (S121).

In cases where a real slot has not been assigned to the designated virtual slot (S121: NO), the first controller 110 assigns an unassigned real slot in the first pool 124 to the designated virtual slot (S122) and updates the first DMT 135 (S123).

The first controller 110 secures a cache area and stores write data received from the host 30 in the cache area thus secured (S124). The first controller 110 judges, as mentioned earlier, whether the write data are valid data and, in cases where the write data are invalid data, releases the real slot assigned in S122 and discards the write data ("0" data) stored in the cache area (S125). Further, the first controller 110 writes the data to the real slots in the first pool 124 given suitable timing (S126).

The inter-pool copy processing that synchronizes the stored content between pools operates asynchronously to the write processing. The first controller 110 reads the data updated in the first pool (S130) and transmits the data to the second storage control apparatus 20 (S131). The first controller 110 updates the copy management bitmap (S132). The first controller 110 judges whether a copy to the second pool 224 is complete for all the real slots updated in the first pool 124 (S133). Steps S130 to S132 are repeated until a copy of all the updated real slots is complete.

Figure 22:
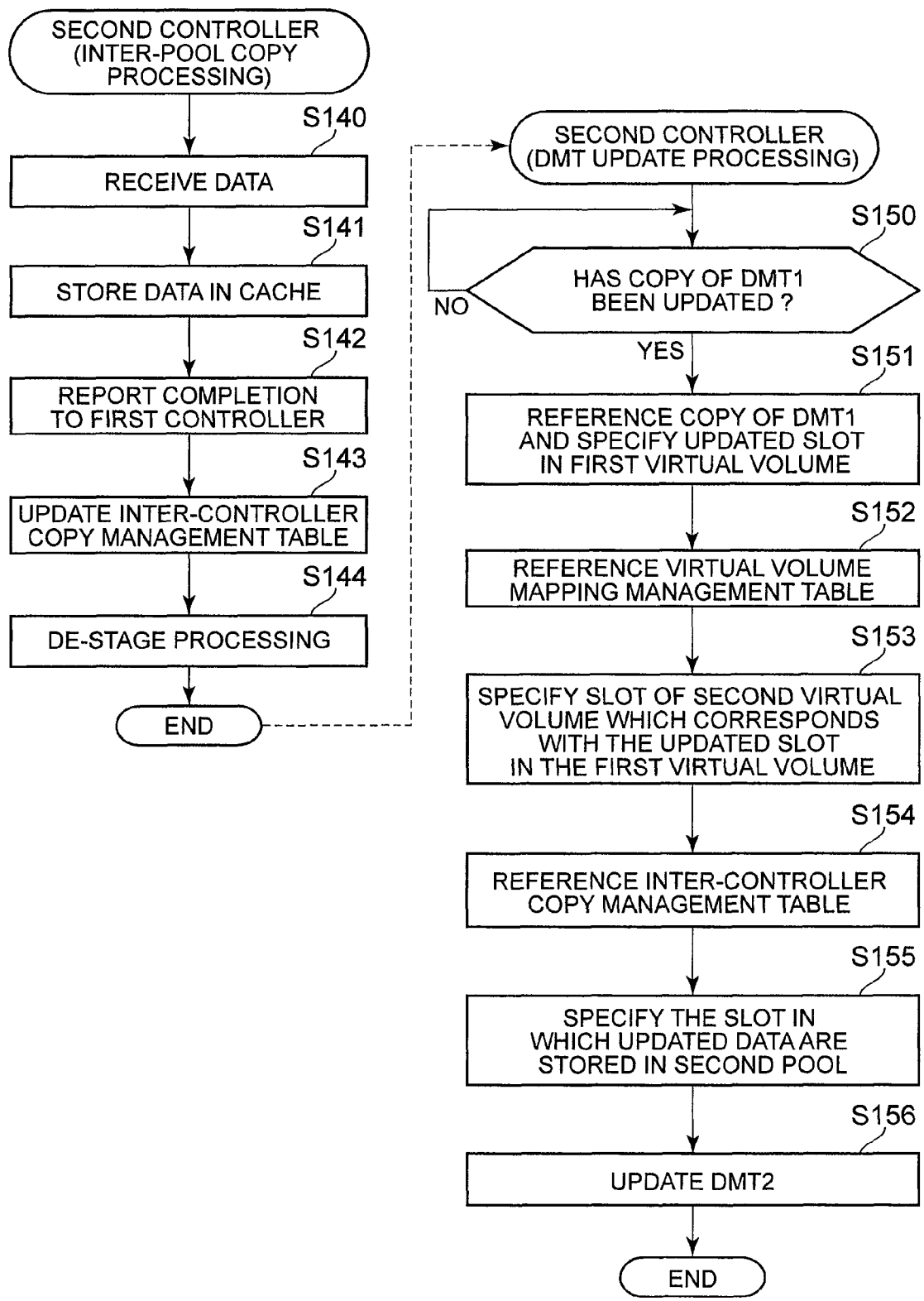
FIG. 22 is a flowchart that shows processing to save data received from the first pool in the second pool and processing to update a second DMT.

FIG. 22 is a flowchart that shows the processing of the second controller 210. The second controller 210 executes inter-pool copy processing (S140 to S144) and DMT update processing (S150 to S156).

The inter-pool copy processing will be described first. Upon receipt of the data from the first controller 110 (S140), the second controller 210 stores the data in the cache memory in the second controller 210 (S141) and reports the fact that processing is complete to the first controller 110 (S142). The second controller 210 updates an inter-controller copy management table 238A (S143). The second controller 210 stores the data stored in the cache memory in a real slot in the second pool 224 given suitable timing (S144).

The DMT update processing will now be described. The second controller 210 grasps where in the second pool 224 the copy 135A of the first DMT 135 is stored. The second controller 210 then judges whether the copy 135A of the first DMT 135 in the second pool 224 has been updated by means of an inter-pool copy from the first pool 124 to the second pool 224 (S150).

In cases where the copy 135A of the first DMT 135 in the second pool 224 has been updated (S150: YES), the second controller 210 references the copy 135A and specifies an updated virtual slot in the first virtual volume 140 (S151).

The second controller 210 references the virtual volume mapping management table 236 (S152) and specifies a virtual slot in the second virtual volume 240 which corresponds with the updated virtual slot in the first virtual volume 140 (S153).

The second controller 210 references the inter-controller copy management table 238A (S154) and confirms in which real slot in the second pool 224 the data stored in the updated virtual slot in the first virtual volume 140 (that is, the updated virtual slot data) are stored (S155).

As a result of this processing, the virtual slot of the update target of the second virtual volume 240 and the storage destination of the update data are judged. The second controller 210 therefore updates the second DMT 235 stored in the second pool 224 (S156).

FIG. 23 is an explanatory diagram that schematically shows the relationship between the respective tables when the second DMT 235 is updated. The virtual slot is specified on the left side of FIG. 23 and the real slot is specified on the right side of FIG. 23.

As mentioned hereinabove, the copy 135A of the first DMT 135 associates and manages the address (virtual slot number) of the first virtual volume 140 and the data storage destination address (real slot number). When the stored content of the first virtual volume 140 has changed, the first DMT 135 is updated in accordance with this change. The content of the copy 135A of the first DMT 135 is also updated by the inter-pool copy.

The virtual slot of the second virtual volume 240 which corresponds to the virtual slot updated by the first virtual volume 140 can be detected by referencing the virtual volume mapping management table 236.

However, the updated real slot in the first pool 124 can be detected by referencing the copy 135A of the first DMT 135. In addition, the real slot in the second pool 224 which corresponds with the updated real slot in the first pool 124 can be detected by using the inter-controller copy management table 238A and logical volume management table 233. Therefore, as shown at the bottom of FIG. 23, the second controller 210 is able to update the second DMT 235 that manages the second virtual volume 240 on the basis of the updated virtual slot and the updated real slot.

This embodiment so constituted affords the same results as those of the first embodiment. In addition, in this embodiment, data are copied between the first pool 124 and second pool 224 and the second controller 210 updates the second DMT 235 for managing the second virtual volume 240 on the basis of the result of the inter-pool copy.

Therefore, in this embodiment, in cases where data are copied from the first storage control apparatus 10 to the second storage control apparatus 20 and in a copy in the opposite direction, invalid data ("0" data) are not transferred. Therefore, the stored content of the first virtual volume 140 and the stored content of the second virtual volume 240 can be matched without increasing the load of the communication network used in the inter-pool copy.

Fifth Embodiment

The fifth embodiment will now be described on the basis of FIG. 24. The fifth embodiment corresponds to a modified example of the fourth embodiment and places the second storage control apparatus 20 in a so-called 'cold standby' state. That is, as a result of the inter-pool copy, a state where the second virtual volume 240 can be generated at any time is established and the second virtual volume 240 can be constructed when a fault occurs and supplied to the host 30.

FIG. 24 is flowchart that shows processing that is executed by the second controller 210 during disaster recovery. The second controller 210 detects the fact that a fault has occurred in the first storage control apparatus 10 (S160). In cases where heartbeat communication which is executed with the first controller 110 is stopped or in cases where a disaster recovery instruction is supplied by the host 30 or management server 40, for example, the second controller 210 is able to detect the fact that a fault has occurred in the first storage control apparatus 10.

The second controller 210 generates a second virtual volume 240 by using the second DMT 235 which is stored in the second pool 224 (S161), makes communication path settings and supplies the second virtual volume 240 to the host 30 (S162). The second controller 210 processes read commands and write commands from the host 30 and sends the processing results back to the host 30 (S163). This embodiment so constituted also affords the same effects as those of the first and fourth embodiments.

The present invention is not limited to the above respective embodiments. A person skilled in the art is able to make a variety of additions and modifications within the scope of the present invention.

What is claimed is:

1. A storage control apparatus which is used by a write command issuing device, comprising:
    a real storage area management unit that manages a pool which has a plurality of real storage areas;
    a virtual volume constituted by a plurality of virtual storage areas, the real storage areas being assigned to the virtual storage areas in accordance with a write command issued by the write command issuing device;
    a storage area management table which is for managing relationships between the respective virtual storage areas and the respective real storage areas, and which is saved in the pool; and
    a virtual volume control unit that assigns a predetermined real storage area selected from among unassigned real storage areas among the respective real storage areas in the pool to the predetermined virtual storage area which corresponds with the write command among the respective virtual storage areas which constitute the virtual volume,
    wherein processing to update the storage area management table in the pool and processing to store write data, which correspond with the write command, in the predetermined real storage area are executed asynchronously,
    wherein the virtual volume control unit executes processing to update the storage area management table after assigning the predetermined real storage area to the predetermined virtual storage area and then executes processing to store the write data in the predetermined real storage area, and
    wherein the virtual volume control unit determines whether the write data are invalid write data after updating the storage area management table and, when a determination is made that the write data are invalid write data, determines whether the data already stored in the predetermined real storage are invalid data and, when a determination is made that the data already stored in the predetermined real storage area are invalid data, releases the predetermined real storage area and updates the storage area management table once again, and discards the invalid write data.

2. The storage control apparatus according to claim 1, wherein the virtual volume control unit determines whether the write data are invalid write data after updating the storage area management table and, when a determination is made that the write data are invalid write data, releases the predetermined real storage area assigned to the predetermined virtual storage area, updates the storage area management table once again, and discards the invalid write data.

3. The storage control apparatus according to claim 2, wherein, when a determination is made that the write data are valid write data, the virtual volume control unit stores the write data in the predetermined real storage area.

4. The storage control apparatus according to claim 1, wherein, when a determination is made that the write data are valid write data and when a determination is made that the data already stored in the predetermined real storage area are valid data, the virtual volume control unit stores the write data in the predetermined real storage area.

5. The storage control apparatus according to claim 1, wherein, in cases where the write data are "0" data, the virtual volume control unit determines that the write data are invalid write data and, in cases where the write data are not "0" data, the virtual volume control unit determines that the write data are valid write data.

6. The storage control apparatus according to claim 1, wherein the real storage area management unit manages a plurality of pools, and the storage area management table and the write data are each stored in the same pool.

7. The storage control apparatus according to claim 1, wherein the pool is provided outside the storage control apparatus.

8. The storage control apparatus according to claim 1, wherein the virtual volume control unit is also able to transfer the write data and the storage area management table to another storage control apparatus for storage therein.

9. The storage control apparatus according to claim 1, wherein the write command issuing device is any one of a host computer, another storage control apparatus, and a backup device for holding backup data.

* * * * *